US012212609B2

(12) United States Patent
Kuppelur et al.

(10) Patent No.: US 12,212,609 B2
(45) Date of Patent: Jan. 28, 2025

(54) VOICE OVER INTERNET PROTOCOL MULTIMEDIA SUBSYSTEM

(71) Applicant: Apple Inc., Cupertino, CA (US)

(72) Inventors: Nitin Kuppelur, Bangalore (IN); Anish George, Bangalore (IN); Karthik Anantharaman, Cupertino, CA (US); Deepak Dash, Bangalore (IN)

(73) Assignee: Apple Inc., Cupertino, CA (US)

( * ) Notice: Subject to any disclaimer, the term of this patent is extended or adjusted under 35 U.S.C. 154(b) by 323 days.

(21) Appl. No.: 17/847,126

(22) Filed: Jun. 22, 2022

(65) Prior Publication Data

US 2023/0047063 A1 Feb. 16, 2023

(30) Foreign Application Priority Data

Aug. 11, 2021 (IN) .............................. 202141036330

(51) Int. Cl.
*H04L 65/1073* (2022.01)
*H04L 65/1016* (2022.01)
(Continued)

(52) U.S. Cl.
CPC ...... *H04L 65/1073* (2013.01); *H04L 65/1016* (2013.01); *H04W 36/00226* (2023.05); *H04W 36/0033* (2013.01); *H04W 36/1446* (2023.05)

(58) Field of Classification Search
CPC ............ H04L 65/1069; H04L 65/1063; H04L 65/1016; H04L 65/1073; H04W 36/1446; H04W 36/0033; H04W 36/00226
See application file for complete search history.

(56) References Cited

U.S. PATENT DOCUMENTS

2011/0249624 A1 10/2011 Ramachandran et al.
2017/0111406 A1* 4/2017 Ionescu ............... G06F 11/0793
(Continued)

FOREIGN PATENT DOCUMENTS

EP          3214818 A1 * 9/2017   ......... H04L 65/1016
WO     WO-2016132183 A1 * 8/2016   ......... H04L 41/0654

OTHER PUBLICATIONS

[Unknown Author], "3rd Generation Partnership Project; Technical Specification Group Core Network and Terminals; Non-Access-Stratum (NAS) protocol for 5G System (5GS); Stage 3; (Release 17)," 3GPP TS 24.501 V17.3.1, Jun. 2021, 825 pages.

(Continued)

*Primary Examiner* — Mehmood B. Khan
(74) *Attorney, Agent, or Firm* — Fish & Richardson P.C.

(57) ABSTRACT

This disclosure describes a user equipment device (UE). The UE includes one or more antennas; one or more radios, where each of the radios is configured to perform cellular communication using a plurality of radio access technologies (RATs) that support voice over an Internet protocol (IP) multimedia subsystem (IMS); one or more processors coupled to the one or more radios, where the one or more processors are configured to cause the UE to perform operations including: sending, via a first RAT, a first request for IMS registration to an IMS server; receiving, from the IMS server, an IMS rejection message indicating failure of the IMS registration; determining, based on the IMS rejection message, that the IMS registration failure is temporary; responsively re-attempting IMS registration with the IMS server; and determining to camp on the first RAT in response to receiving an IMS acceptance message from the IMS server.

20 Claims, 14 Drawing Sheets

(51) Int. Cl.
*H04W 36/00* (2009.01)
*H04W 36/14* (2009.01)

(56) References Cited

U.S. PATENT DOCUMENTS

| | | | |
|---|---|---|---|
| 2017/0181215 A1* | 6/2017 | Gaur | ........................ H04L 69/40 |
| 2018/0007729 A1 | 1/2018 | Koshta et al. | |
| 2019/0149583 A1* | 5/2019 | Jutila | .................. H04L 65/1063 |
| | | | 455/435.1 |
| 2020/0170064 A1* | 5/2020 | Keller | ...................... H04L 69/40 |
| 2020/0305032 A1 | 9/2020 | Kuppelur et al. | |
| 2021/0258824 A1 | 8/2021 | John et al. | |
| 2022/0417798 A1 | 12/2022 | Chinthalapudi et al. | |
| 2023/0047609 A1 | 2/2023 | Kuppelur et al. | |
| 2023/0049004 A1 | 2/2023 | Kuppelur et al. | |
| 2023/0262099 A1* | 8/2023 | Yang | ..................... H04L 47/826 |
| | | | 370/331 |
| 2023/0412649 A1 | 12/2023 | Kuppelur et al. | |
| 2023/0422159 A1* | 12/2023 | Lee | ....................... H04W 60/04 |
| 2024/0008137 A1 | 1/2024 | Kragten et al. | |
| 2024/0214878 A1* | 6/2024 | Shen | ............... H04W 36/00226 |

OTHER PUBLICATIONS

[Unknown Author], "3rd Generation Partnership Project; Technical Specification Group Core Network and Terminals; Non-Access-Stratum (NAS) protocol for Evolved Packet System (EPS); Stage 3 (Release 16)," 3GPP TS 24.301 V17.3.0, Jun. 2021, 564 pages.

* cited by examiner

810 ↘

812 — SENDING, FROM A USER EQUIPMENT (UE) TO A COMMUNICATIONS NETWORK ASSOCIATED WITH A FIRST RADIO ACCESS TECHNOLOGY (RAT) OF THE PLURALITY OF RATS, A FIRST REQUEST FOR INTERNET PROTOCOL (IP) MULTIMEDIA SUBSYSTEM (IMS) REGISTRATION, WHERE THE UE IS CAMPED ON A FIRST CELL OF THE FIRST RAT

814 — DETERMINING, BASED ON AN IMS REJECTION FAILURE, THAT THE IMS REGISTRATION FAILURE IS DUE TO A TEMPORARY RADIO FAILURE

816 — RESPONSIVELY ATTEMPTING TO PERFORM THE IMS REGISTRATION ON EACH OTHER CELL OF THE FIRST RAT UNTIL THE IMS REGISTRATION IS SUCCESSFUL

FIG. 8B

VOICE OVER INTERNET PROTOCOL MULTIMEDIA SUBSYSTEM

CROSS-REFERENCE TO RELATED APPLICATION

This application claims priority to Indian Patent Application No. 202141036330, filed Aug. 11, 2021, the entire contents of which are incorporated herein by reference.

TECHNICAL FIELD

The present application relates to the field of wireless communications.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of higher throughputs possible at higher frequencies

SUMMARY

In the 5th generation mobile communication system (5GS) specified by the 3rd Generation Partnership Project (3GPP), voice services are supported via an Internet Protocol (IP) multimedia subsystem (IMS). For various reasons, it is possible that voice over IMS may not be available or may become unavailable on a 5G cell while the UE is camped on it. In existing configurations of 5GS, when voice over IMS becomes unavailable for a UE that is operating in a single-registration mode, if the UE's usage setting is "voice centric" (e.g., support of voice services is essential for the user), the UE disables its 5G capability ("N1 mode") so that it no longer attempts to camp on the 5G cell or register via 5G. Instead, the UE selects another radio access technology (RAT) where Evolved Packet Core (EPC) is available (e.g., as specified in 3GPP TS 24.301 section 4.9.2). A similar configuration is also defined for LTE (e.g., in 3GPP TS 24.301 section 4.3.2.4). After disabling the N1 or LTE mode ("N1/LTE mode"), the UE starts a timer for re-enabling N1/LTE mode. In order to enable N1/LTE mode once the timer expires, the UE stores the identity of the public land mobile network (PLMN) in which N1/LTE mode was disabled. Once the timer expires, the UE uses the stored identity to re-enable N1/LTE mode.

However, existing configurations do not address various scenarios, which are detrimental to user experience, that occur due to voice over IMS becoming unavailable. For example, the existing configurations do not address scenarios where the UE unnecessarily remains connected to the low priority RAT after disabling the high priority RAT due to voice over IMS failure. Being connected to the low priority RAT for longer than necessary is detrimental to user experience. This disclosure describes these scenarios and provides solutions that prevent these scenarios or resulting errors, thereby improving user experience. Note that although the disclosed examples describe 5G as the high priority RAT and LTE as the low priority RAT, the disclosed embodiments are not limited to that configuration.

In accordance with aspects of the present disclosure, a user equipment device (UE) is disclosed. The UE includes one or more antennas; one or more radios, wherein each of the one or more radios is configured to perform cellular communication using a plurality of radio access technologies (RATs) that support voice over an Internet protocol (IP) multimedia subsystem (IMS); one or more processors coupled to the one or more radios, wherein the one or more processors are configured to cause the UE to perform operations comprising: sending, via a first RAT of the plurality of RATs, a first request for IMS registration to an IMS server; receiving, from the IMS server, an IMS rejection message indicating failure of the IMS registration; determining, based on the IMS rejection message, that the IMS registration failure is temporary; responsively re-attempting IMS registration with the IMS server; and determining to camp on the first RAT in response to receiving an IMS acceptance message from the IMS server.

In some implementations, the UE is camped on the first RAN, and wherein re-attempting IMS registration with the IMS server comprises: disconnecting from the first RAT and camping on a second RAT of the plurality of RATs; establishing an IMS Packet Data Network (PDN) with the second RAT; sending, via the second RAT, a second request for IMS registration to the IMS server; and receiving, via the second RAT, the IMS acceptance message from the IMS server.

In some implementations, the second RAT supports interworking with the first RAT, wherein determining to camp on the first RAT in response to receiving the IMS acceptance message involves: identifying a second cell associated with the first RAT that has an acceptable radio condition; disconnecting from the second RAT and camping on the second cell associated with the first RAT; and handing over information associated with the IMS PDN to the second cell.

In some implementations, the acceptable radio condition has a value that is greater than a predetermined threshold.

In some implementations, the second RAT is a non-3GPP network.

In some implementations, the operations further involve periodically attempting to camp on the first RAT and re-attempting IMS registration with the IMS server via the first RAT.

In some implementations, the first RAT is a $5^{th}$ generation mobile communication system (5GS).

In accordance with aspects of the present disclosure, a method is disclosed. The method is to be performed by a user equipment device (UE), where the UE camped on a first radio access technology (RAT) of a plurality RATs. The method involves sending, via the first RAT, a first request for IMS registration to an IMS server; receiving, from the IMS server, an IMS rejection message indicating failure of the IMS registration; determining, based on the IMS rejection message, that the IMS registration failure is temporary; responsively re-attempting IMS registration with the IMS server; and determining to camp on the first RAT in response to receiving an IMS acceptance message from the IMS server.

The previously-described implementations can be performed using computer-implemented methods; a non-transitory, computer-readable medium storing computer-readable instructions to perform the computer-implemented methods; a processor including circuitry to execute one or more instructions that, when executed, cause the processor to perform the computer-implemented methods; and a computer system including a computer memory interoperably coupled with a hardware processor configured to perform the computer-implemented methods or the instructions stored on the non-transitory, computer-readable medium.

The details of one or more implementations of the subject matter described in this disclosure are set forth in the accompanying drawings and the description. Other features, aspects, and advantages of the subject matter will become apparent from the description, the drawings, and the claims.

BRIEF DESCRIPTION OF THE DRAWINGS

FIG. 7A, FIG. 7B, FIG. 8A, FIG. 8B, and FIG. 9 each illustrate a flowchart of an example method, according to some implementations of the present disclosure.

Like reference numbers and designations in the various drawings indicate like elements.

DETAILED DESCRIPTION

Figure 1A:
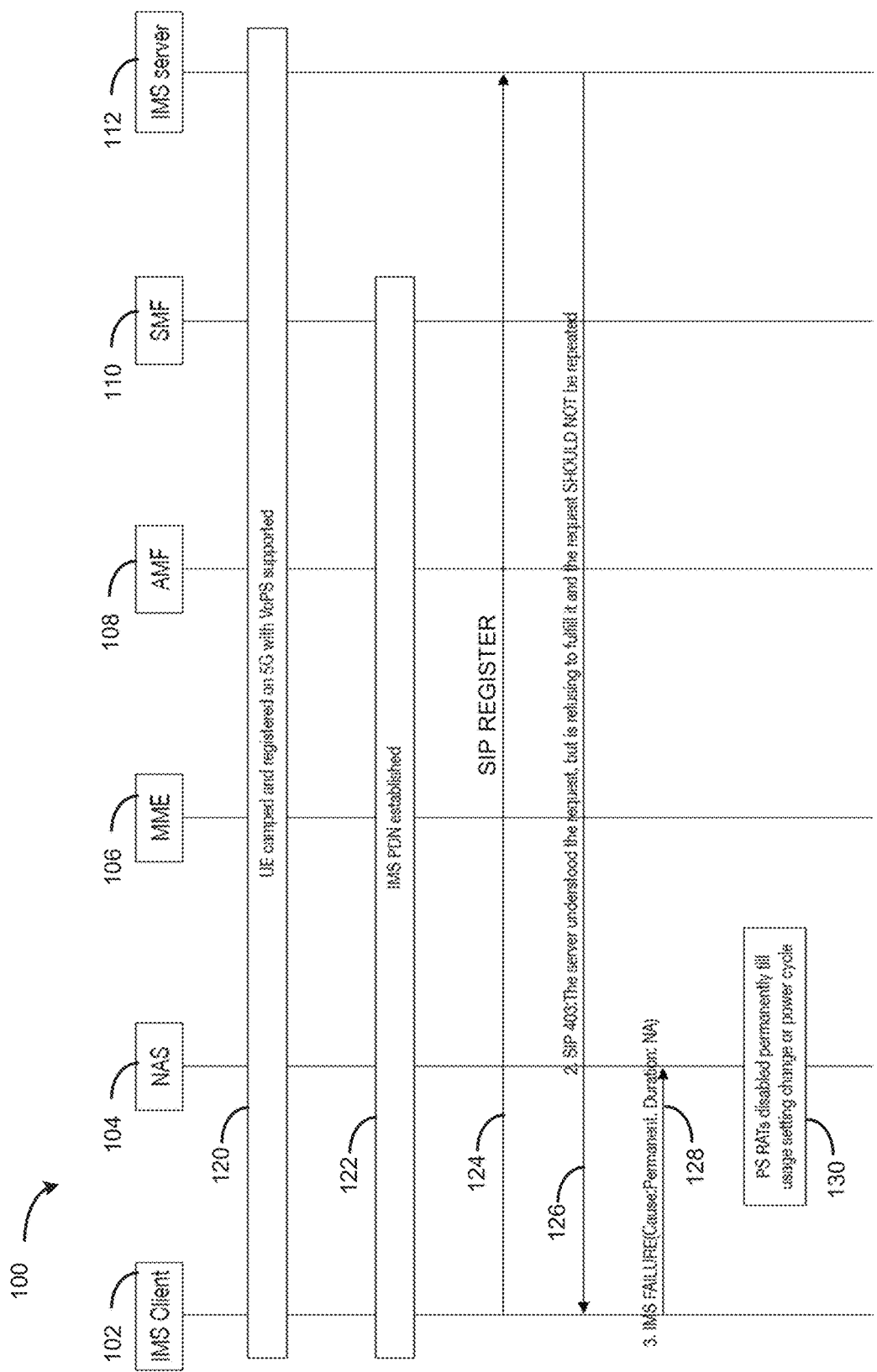
FIG. 1A and FIG. 1B illustrate example signaling flows for synchronizing an IMS registration failure cause with a RAT disable type, according to some implementations of the present disclosure.

In the 5th generation mobile communication system (5GS) specified by the 3rd Generation Partnership Project (3GPP), voice services are provided via an Internet Protocol (IP) Multimedia Subsystem (IMS). The IMS voice service (also referred to as "voice over IMS" or "voice over PS" (VoPS)) can be provided to a user equipment (UE) in various ways, including: (i) a radio access technology (RAT) that uses "Voice over New Radio" (VoNR), Voice over LTE (VoLTE), or "Voice over E-UTRA connected to 5G Core" (VoLTE-5GC), (ii) a RAT that is reached via inter-RAT fallback (e.g., via handover or release with redirection from NR to E-UTRA connected to 5GC), or (iii) Evolved Packet System (EPS) fallback (e.g., via handover or release with redirection to E-UTRA connected to EPC) as "Voice over LTE" (VoLTE). When a UE connects to a wireless communication network that supports voice over IMS, an IMS client on the UE triggers IMS Packet Data Unit (PDU) session establishment followed by IMS registration with an IMS server of the wireless communication network. The IMS client uses Session Initiation Protocol (SIP) messaging to register with the IMS server.

For various reasons, it is possible that voice over IMS may not be available or may become unavailable on a 5G cell while the UE is camped on it. In existing configurations of 5GS, when voice over IMS becomes unavailable for a UE that is operating in a single-registration mode, if the UE's usage setting is "voice centric" (e.g., support of voice services is essential for the user), the UE disables its 5G capability ("N1 mode") so that it no longer attempts to camp on the 5G cell or register via 5G. Instead, the UE selects another RAT where Evolved Packet Core (EPC) is available (e.g., as specified in 3GPP TS 24.301 section 4.9.2) or may alternatively select any other system that may be available to make voice call. A similar configuration is also defined for LTE (e.g., in 3GPP TS 24.301 section 4.3.2.4). After disabling the N1 or LTE mode ("N1/LTE mode"), the UE starts a timer for re-enabling N1/LTE mode. In order to enable N1/LTE mode once the timer expires, the UE stores the identity of the public land mobile network (PLMN) in which N1/LTE mode was disabled. Once the timer expires, the UE uses the stored identity to re-enable N1/LTE mode.

In this disclosure, the original RAT on which the UE is camped is referred to as a "high priority RAT," and a "low priority RAT" refers to the RAT that the UE selects in response to IMS voice becoming unavailable on the high priority RAT. Generally, the high priority RAT offers the UE a higher quality connection or better services than the low priority RAT. For example, for a UE that is camped on a 5G network and selects LTE in response to voice over IMS becoming unavailable on 5G, the "high priority RAT" is 5G and the "low priority RAT" is LTE. Other examples are possible.

However, existing configurations do not address various scenarios, which are detrimental to user experience, that occur due to voice over IMS becoming unavailable. For example, the existing configurations do not address scenarios where the UE unnecessarily remains connected to the low priority RAT after disconnecting from the high priority RAT due to voice over IMS failure. Being connected to the low priority RAT for longer than necessary is detrimental to user experience. This disclosure describes these scenarios and provides solutions that prevent these scenarios or resulting errors, thereby improving user experience. Note that although the disclosed examples describe 5G as the high priority RAT and LTE as the low priority RAT, the disclosed embodiments are not limited to that configuration.

One scenario that results in errors detrimental to user experience occurs when a high priority RAT is disabled for a UE due to a failure during SIP registration. When a failure occurs in SIP registration, the UE's IMS client provides the UE's non-access stratum (NAS) module with information indicative of the failure, including an IMS retry-timer that indicates when the IMS client will re-attempt SIP registration. In response to receiving the information, the NAS module disables the high priority RAT for the UE and starts a timer for re-enabling the RAT. However, despite the high priority RAT being disabled due to the SIP registration failure, the RAT disable timer is not linked with the IMS retry-timer. This disconnect can result in one or more of the following errors.

A first error can occur when the IMS retry-timer is smaller than the RAT disable timer. In this scenario, even though the UE can reattempt IMS registration after the IMS retry-timer expires, the UE cannot register with the high priority RAT because the RAT disable timer has not expired. As a result, the UE is forced to remain connected to the low priority RAT for longer. A second error can occur when the IMS retry-timer is greater than the RAT disable timer. Here, although the UE can register with the high priority RAT once the RAT disable timer expires, the UE cannot perform IMS registration since the IMS-retry timer has not expired. As a result, the high priority RAT is disabled once again, and the UE is forced to remain connected to the low priority RAT for longer. A third error can occur when the IMS client receives a permanent SIP rejection that prevents the UE from reattempting SIP registration or receives an indication that IMS services are not available. In this scenario, after the RAT disable timer expires, the UE successfully registers with the high priority RAT, but cannot perform IMS registration due to the permanent SIP rejection. As a result, the high priority RAT is disabled once again, and the UE is forced to remain connected to the low priority RAT for longer.

Disclosed herein are methods and systems that resolve the disconnect between the IMS retry-timer and the RAT disable timer. In some embodiments, the IMS failure information is synchronized with the RAT disable type. More specifically, the IMS client is configured to share an IMS registration failure cause with the NAS module that is responsible for disabling the high priority RAT. The NAS module uses the IMS registration failure cause to determine whether to temporarily or permanently disable the high priority RAT. In an example, if the IMS failure cause is permanent, the NAS module determines to permanently disable the high priority RAT for the UE. Conversely, if the IMS failure cause is temporary, the NAS module determines to temporarily disable the high priority RAT for the UE.

Synchronizing the IMS failure cause with the RAT disable type prevents, for example, errors that result from the IMS client receiving a permanent SIP rejection. In some examples, the NAS module is configured to use the IMS registration failure cause to determine the RAT disable type for all failure scenarios, including, but not limited to, scenarios where IMS registration fails or IMS PDU/Packet Data Network (PDN) establishment is rejected due to a permanent cause.

Figure 1B:
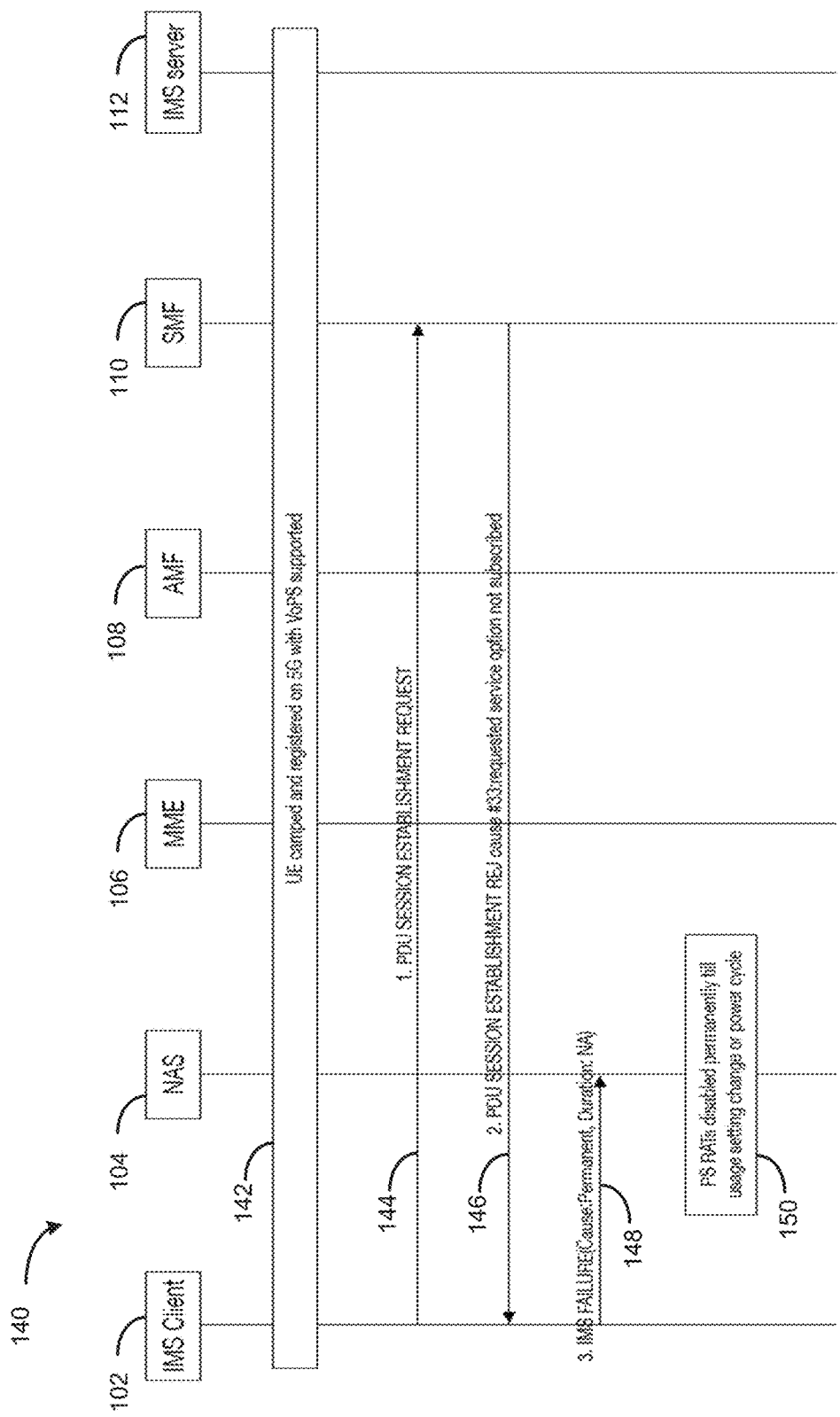

FIG. 1A and FIG. 1B illustrate example signaling flows for synchronizing an IMS registration failure cause with a RAT disable type, according to some implementations. More specifically, FIG. 1A illustrates an example signaling flow 100 for synchronizing an IMS failure received in a SIP message with a RAT disable type. In this example, a UE is camped and registered with a 5G network that supports Voice over Packet Switched (VoPS), as shown by block 120. The UE includes a NAS module 104. Further, the UE has established an IMS PDN with the 5G network, as shown by block 122. The 5G network includes a Mobility Management Entity (MME) 106, an Access and Mobility Management Function (AMF) 108, a Session Management Function (SMF) 110, and IMS server 112.

As shown in FIG. 1A, an IMS client 102 of the UE sends a SIP register message 124 to the IMS server 112. In response, the IMS server 112 sends a SIP reject message 126 to the IMS client 102. The SIP reject message 126 specifies that the IMS server 112 understood the request, but is refusing to fulfill it and that the request should not be repeated (i.e., a permanent SIP rejection). The IMS client 102, in response to receiving the SIP reject message 126, sends an IMS failure message 128 to the NAS module 104. The IMS failure message 128 includes a cause of the failure and a duration of an IMS-retry timer. In this example, the cause of the failure is "permanent," and therefore, the IMS failure message 128 does not include an IMS-retry timer. The NAS module 104 determines the RAT disable type based on the cause of the failure. In this example, given that the cause is permanent, the NAS module 104 determines that the RAT disable type is also permanent. Accordingly, the NAS module 104 permanently disables the first RAT for the UE until the UE usage settings change or the UE's power cycles, as shown by block 130.

FIG. 1B illustrates an example signaling flow 140 for synchronizing an IMS PDU establishment reject cause with the RAT disable type. In this example, the UE is camped and registered with the 5G network that supports Voice over Packet Switched (VoPS), as shown by block 142. As shown in FIG. 1B, the IMS client 102 sends a PDU session establishment request 144 to the SMF 110. The SMF 110 sends a PDU session establishment rejection message 146 to the NAS module 104, which subsequently shares the rejection message with the IMS client 102. In this example, the PDU session establishment rejection message 146 includes a cause of the rejection (e.g., cause #33: requested service option not subscribed).

The IMS client 102, in response to receiving the PDU session establishment rejection message 146, sends an IMS failure message 148 to the NAS module 104. The IMS failure message 148 includes a cause of the failure and a duration of an IMS-retry timer. In this example, the cause of the failure is "permanent," and therefore, the IMS failure message 148 does not include an IMS-retry timer. The NAS module 104 determines the RAT disable type based on the cause of the failure. In this example, given that the cause is permanent, the NAS module 104 determines that the RAT disable type is permanent. Accordingly, the NAS module 104 permanently disables the first RAT for the UE until the UE usage settings change or the UE's power cycles, as shown by block 150.

In some embodiments, if the IMS registration failure is temporary, the IMS client additionally shares the IMS retry-timer with the NAS module (e.g., in an IMS failure message). Doing so enables the NAS module to use the IMS retry-timer to determine the value of the RAT disable timer. For instance, the NAS module can determine to disable the high priority RAT for at least the duration of the IMS retry-timer. In some examples, the NAS module provides the IMS client with a new IMS retry-timer that is equal to the RAT disable timer so that both timers are synchronized. This ensures that the IMS client does not reattempt IMS registration until the RAT disable timer expires. However, if the NAS module does not provide the IMS client with a new IMS retry-timer, then the IMS client is configured to determine a new IMS retry-timer value using other mechanisms, e.g., mechanisms defined in 4.5 of RFC 5626 or by using values recommended by the network operator.

Figure 2:
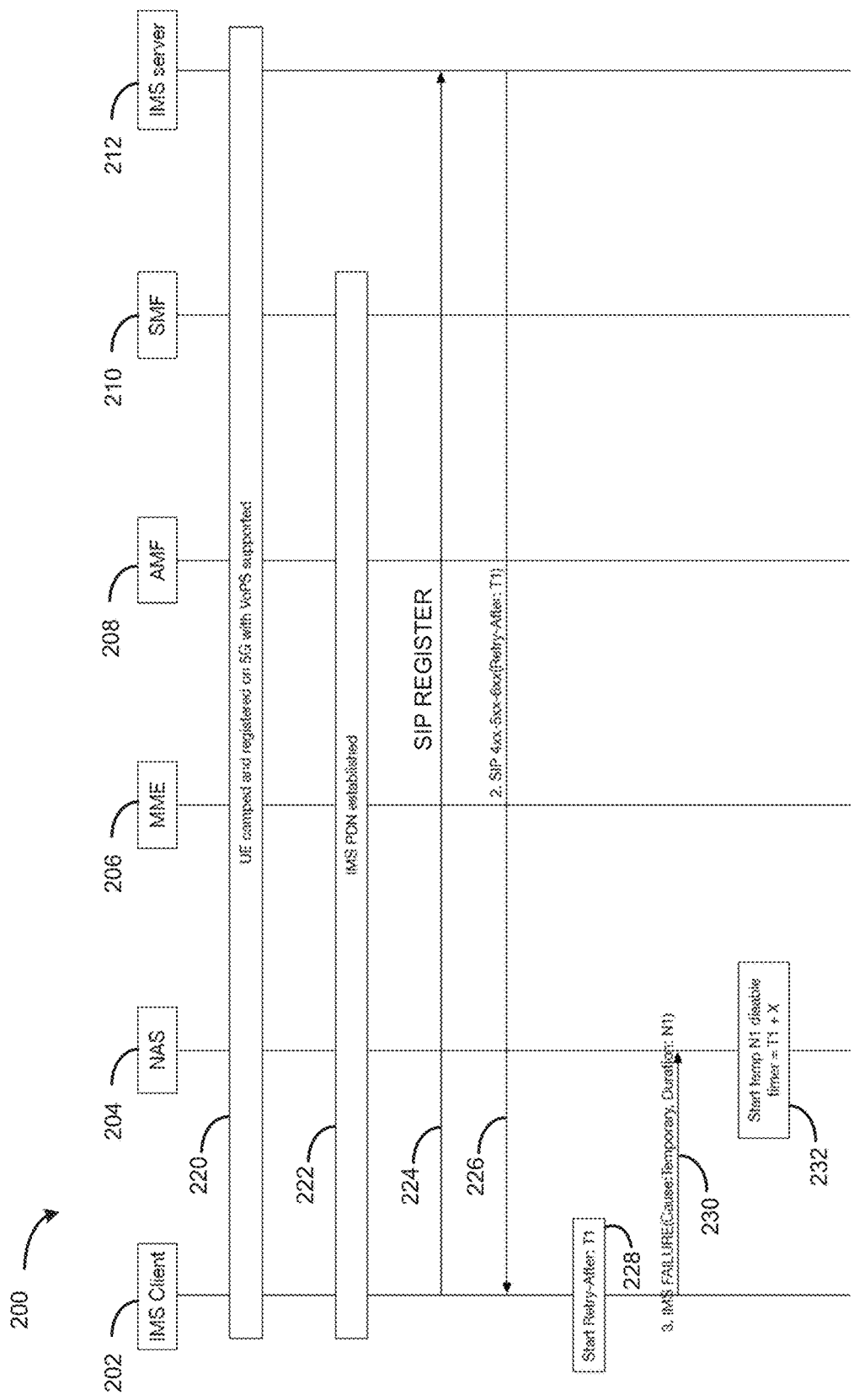
FIG. 2 illustrates an example signaling flow that synchronizes an IMS retry-timer with a RAT disable timer, according to some implementations of the present disclosure.

FIG. 2 illustrates an example signaling flow 200 that synchronizes an IMS retry-timer with a RAT disable timer, according to some implementations. In this example, a UE is camped and registered with a 5G network that supports Voice over Packet Switched (VoPS), as shown by block 220. The UE includes a NAS module 204. Further, the UE has established IMS PDN with the 5G network, as shown by block 222. The 5G network includes an MME 206, an AMF 208, an SMF 210, and an IMS server 212.

As shown in FIG. 2, an IMS client 202 of the UE sends a SIP register message 224 to the IMS server 212. In response, the IMS server 210 sends a SIP message 226 to the IMS client 202. The SIP message 226 indicates that the failure in SIP registration is temporary. Accordingly, upon receipt of the SIP message 226, the IMS client 202 starts an IMS-retry timer, T1, as shown by block 228. The IMS client 202 sends an IMS failure message 230 to the NAS module 204. The IMS failure message 230 includes a cause of the failure and a duration of an IMS-retry timer. In this example, the cause of the failure is "temporary," and the IMS-retry timer duration is T1. The NAS module 204 determines the RAT retry timer value based on the IMS-retry timer. In this example, the NAS module 204 determines that the value of the RAT retry timer is "T1+X," as shown by block 232. As described previously, in some examples, the IMS client 202 also determines the value of the RAT retry timer and changes the value of the IMS-retry timer to match the value of the RAT retry timer. More specifically, the IMS client 202 can determine the IMS-retry timer by receiving the RAT retry timer or by using another mechanism (e.g., calculating "T1+X," where "X" is an implementation specific value).

Another scenario that results in errors detrimental to user experience occurs when a high priority RAT is disabled due to a temporary radio failure (e.g., RACH failure, radio link failure, etc.). In this scenario, if a UE's connection establishment fails or the connection gets released due to a temporary radio failure during IMS registration, the UE's IMS client attempts to register for up to a maximum number of times. If the registration is not successful, the IMS client determines that IMS registration has failed and the UE camps on a low priority RAT. Existing configurations, however, do not address scenarios where the UE can reconnect the high priority RAT, as illustrated by the following example scenarios.

A first example scenario occurs when multiple cells of a high priority RAT, other than the serving cell on which the temporary radio failure occurs, are available. Here, existing configurations do not account for the temporary radio failure only affecting the serving cell, which is common due to the bursty nature of these failures. Instead, the existing configurations direct the UE to camp on a low priority RAT, even though other cells of the high priority RAT that share the PLMN and fulfill the S-criteria are available. A second example scenario occurs when the UE moves after the temporary radio failure occurs. Here, the existing configurations do not account for the UE moving to a different location where other high priority RAT cells are likely available. Under the existing configurations, even if the UE moves to different location where other high priority RAT cells are available, the high priority RAT remains barred and the UE remains connected to the low priority RAT. A third example scenario occurs when the temporary radio failure lasts for a short duration. In this scenario, the high priority RAT is barred for a duration that is longer than the short duration that the temporary radio failure is expected to persist in the serving cell.

Also disclosed herein are methods and systems that prevent errors that can occur when a high priority RAT is disabled for a UE due to a temporary radio failure (e.g., RACH failure, radio link failure, etc.). In some embodiments, the UE is configured to attempt IMS registration on all available cells of the high priority RAT before disabling the RAT. At any given place, it is highly likely for the UE to have access to one or more cells that satisfy the S-criteria and that are able to provide a stable connection to the UE. Accordingly, for temporary radio failures, which are generally are bursty in nature and affect only a specific cell (e.g. due to interference or fading, consistent message collision, load factor, SINR), the UE is configured to attempt the IMS registration on all other available cells above the S-Criteria (of the current PLMN and RAT combination) before attempting to camp on the low priority RAT. More specifically, after detecting a bad radio condition (e.g., less than a threshold) and/or a connection establishment failure, the UE is configured to temporarily bar the serving cell of the high priority RAT. Then, the UE is configured to attempt IMS registration on other available cells of the current PLMN. After the UE determines that no more cells are available in the current RAT of the registered/selected PLMN (including EPLMNs of the registered PLMN), the UE may reselect to cells belonging to other RATs (e.g., belonging to EPLMN of the registered PLMN). Alternatively, if a predetermined maximum number of IMS registration attempts have been performed, the UE is configured to attempt to camp on another RAT.

Figure 3:
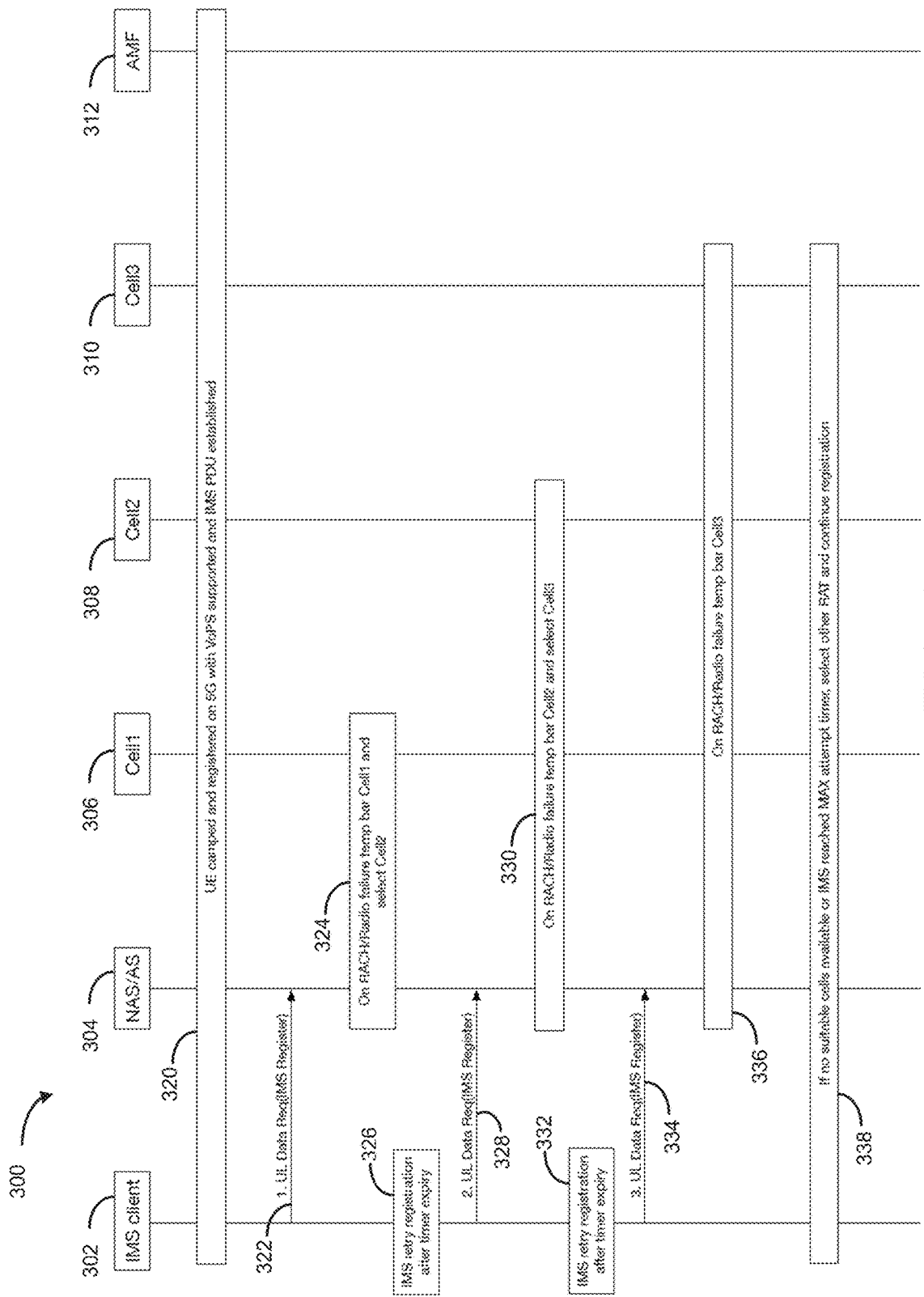
FIG. 3 illustrates a signaling flow for attempting IMS registration on all available cells, according to some implementations of the present disclosure.

FIG. 3 illustrates a signaling flow 300 for attempting IMS registration on all available cells, according to some implementations. In the example of FIG. 3, a UE is camped and registered on a 5G network with VoPS supported and IMS PDU established for the UE, as shown by block 320. The UE includes a NAS/AS module 304. The 5G network includes Cell1 (or cell 306), Cell2 (or cell 308), Cell3 (or cell 310), and AMF 312.

An IMS client 302 of the UE sends an IMS register message 322 to the NAS module 304. The IMS register message 322 includes an uplink (UL) data request. As shown by block 324, due to a temporary radio failure that is detected by the NAS/AS module 304 when attempting to communicate with Cell1, the NAS module 304 temporarily bars Cell1 and selects Cell2. In some examples, the NAS/AS module initiates a temporary barring timer that indicates a period of time for which the cell is temporarily barred. After expiration of an IMS retry-timer, the IMS client 302 retries IMS registration, as shown by block 326. The IMS client 302 sends an IMS register message 328 to the NAS module 304. The IMS register message 328 includes an uplink (UL) data request. As shown by block 330, due to a temporary radio failure that is detected by the NAS/AS module 304 when attempting to communicate with Cell2, the NAS/AS module 304 temporarily bars Cell2 and selects Cell3.

After expiration of an IMS retry-timer, the IMS client 302 retries IMS registration, as shown by block 332. The IMS client 302 sends an IMS register message 334 to the NAS module 304. The IMS register message 334 includes an uplink (UL) data request. As shown by block 336, due to a temporary radio failure detected by the NAS/AS module 304 when attempting to communicate with Cell3, the NAS/AS module 304 temporarily bars Cell3. This process of re-attempting registration is continued until a suitable cell of the RAT is found. If no suitable cells are available or the IMS client has reached a maximum number of registration attempts, the UE selects another RAT and continues registration on the other RAT, as shown by block 338.

In some embodiments, the UE is configured to camp on the high priority RAT after cells with acceptable radio conditions (e.g., greater than a predetermined threshold) of the high priority RAT become available. More specifically, after the UE camps on the low priority RAT, the UE is configured to periodically measure the radio conditions of one or more cells of the high priority RAT.

In one example, the UE is configured to periodically measure the radio conditions of the high priority RAT after the UE changes it location. In this example, the UE can attempt to camp on the high priority RAT when it detects one or more new cells on which the temporary barring timer is not running and that have acceptable radio conditions. The UE location change can be detected by any localization algorithm, including, but not limited to, algorithms that use GPS data or gyroscope data. The periodic scan can be triggered on one or more cell frequencies that are stored in the UE (which were previously detected when camping on the high priority RAT) and/or on an inter-RAT neighboring (IRAT) neighboring cell list broadcast on the low priority RAT. The UE can also track its motion and make decisions based on its motion, e.g., disabling the search timer or performing the search at a different rate compared to stationary conditions. Additionally, the timer duration can be controlled (e.g., optimized) based on operating conditions. For example, the timer condition can be controlled based on whether the UE is actively being used (e.g., the screen is ON) or whether the UE to network traffic is in the foreground or background.

Figure 4:
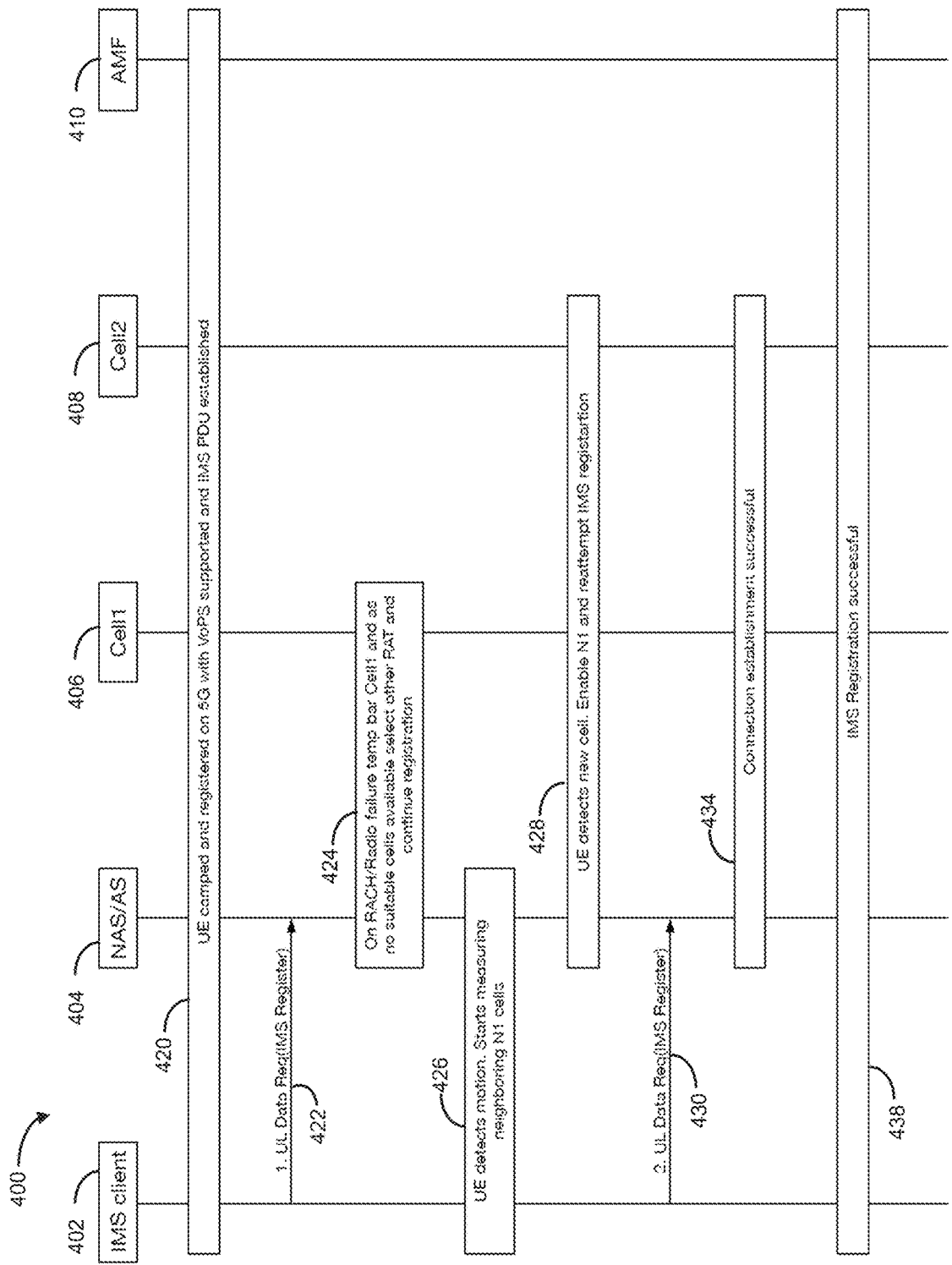
FIG. 4 illustrates a signaling flow for re-enabling a RAT after one or more new cells with acceptable radio conditions become available due to UE motion, according to some implementations of present disclosure.

FIG. 4 illustrates a signaling flow 400 for re-enabling a RAT after one or more new cells with acceptable radio conditions become available due to UE motion, according to some implementations. In the example of FIG. 4, a UE is camped and registered on a 5G network with VoPS supported and IMS PDU established for the UE, as shown by block 420. The UE includes a NAS/AS module 404. The 5G network includes Cell1 (or cell 406), Cell2 (or cell 408), and AMF 410.

An IMS client 402 of the UE sends an IMS register message 422 to the NAS/AS module 404. The IMS register message 422 includes an uplink (UL) data request. As shown by block 424, due a temporary radio failure, the NAS/AS module 404 temporarily bars Cell1. The NAS/AS module 404 then determines if any other acceptable cells are available on the RAT. In this example, the NAS/AS module 404 determines that acceptable cells are not available, and therefore, a new RAT selected.

As shown by block 426, the UE detects a change in location or motion. In response, the UE starts measuring neighboring N1 cells (i.e., cells of the high priority RAT). As shown by block 428, in response to the UE detecting a new N1 cell, the UE enables N1 and reattempts IMS registration. In particular, the IMS client 402 sends an IMS register message 430 to the NAS/AS module 404. As shown by block 434, the connection establishment is successful. Then, as shown by block 438, the IMS registration is successful.

In another example, the UE attempts to camp on the high priority RAT when it detects that the radio conditions of the previously tried cells have improved. Additionally and/or alternatively, the UE attempts to camp on the high priority RAT after the temporary barring timer on the previously tried one or more cells has expired.

Figure 5:
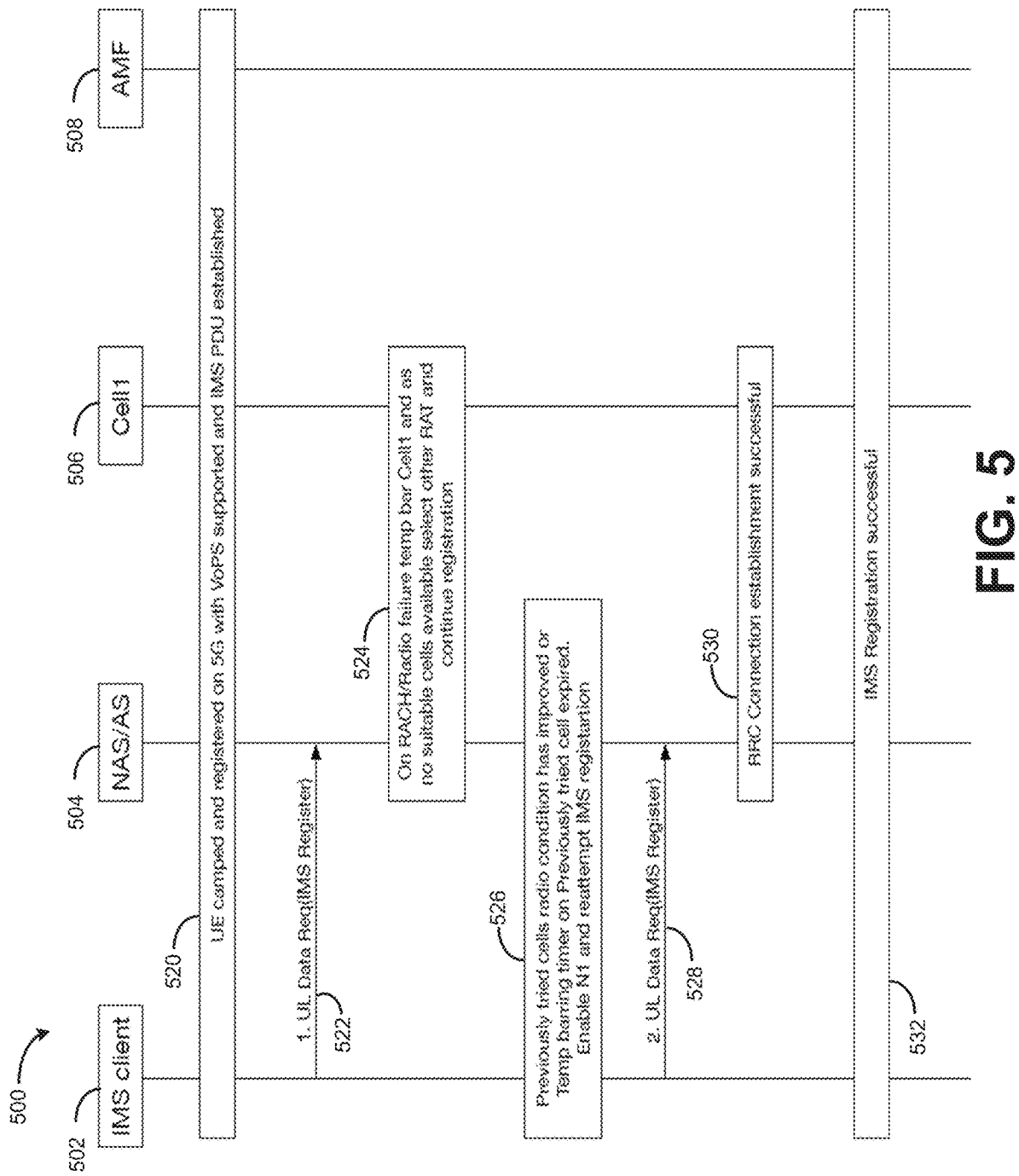
FIG. 5 illustrates a signaling flow for re-enabling a disabled RAT, according to some implementations of present disclosure.

FIG. 5 illustrates a signaling flow 500 for attempting to camp on a RAT, according to some implementations. In particular, signaling flow 500 attempts to camp on a RAT after radio conditions of previously attempted cells of the RAT have improved or temporary barring of the RAT has been removed. In the example of FIG. 5, a UE is camped and registered on a 5G network with VoPS supported and IMS PDU established for the UE, as shown by block 520. The UE includes a NAS/AS module 504. The 5G network includes Cell1 (or cell 506) and AMF 508.

An IMS client 502 of the UE sends an IMS register message 522 to the NAS/AS module 504. The IMS register message 522 includes an uplink (UL) data request. As shown by block 524, the NAS/AS module 504 temporarily bars Cell1 due a temporary radio failure, and initiates a temporary barring timer for Cell1. Furthermore, because no other suitable cells of the RAT are available, the UE selects another RAT (i.e., a low priority RAT) and continues IMS registration. As shown by block 526, the UE determines that the radio conditions of cells that the UE previously attempted to connect to have improved (e.g., Cell1) or that a temporary barring timer on the previously attempted cells has expired. In response, the UE attempts to camp on N1 and reattempts IMS registration. In particular, the IMS client 502 sends an IMS register message 528 to the NAS/AS module 504, which attempts to camp on N1. As shown by block 530, the connection establishment is successful. Then, as shown by block 532, the IMS registration is successful.

As shown by these examples, the RAT disable is optimized based on the cause of IMS registration failure. For example, for causes like RACH failures that are bursty in nature, affecting only specific cells (e.g. due to interference or fading, consistent message collision, load factor, low SINR), the UE attempts the IMS registration on all available cells in same location of same RAT and PLMN combination fulfilling S-criteria. Also, whenever UE detects that it has moved from the area where the connection establishment issues were seen previously or through measurements detects that new cells are available or detect that the connection establishment can be reattempted, the UE reselects back to high priority RAT cells.

Yet another scenario that results in errors detrimental to user experience occurs when the IMS registration failure is temporary. According to existing specifications, if IMS registration fails on the high priority RAT, the UE is still forced to select a low priority RAT even when the IMS registration failure is temporary. As a result, the UE is forced to remain on the low priority RAT even after the temporary failure is resolved.

Disclosed herein are methods and systems that prevent errors that can occur when the high priority RAT is disabled due to a temporary radio failure.

In some embodiments, when a high priority RAT is disabled due to a temporary IMS registration failure, and the UE is successfully camped and registered on a low priority RAT, the UE is configured to re-enable the high priority RAT and reselect a high priority RAT cell. In one example, the UE is camped and registered on a low priority RAT that supports interworking with the high priority RAT. Because the low priority RAT supports interworking with the high priority RAT, the IMS PDN is established with support for interworking with the higher priority RAT.

In this example, the UE is configured to search for a high priority RAT cell of the same registered PLMN that supports VoPS and that is within the S-criteria. If such a high priority RAT cell is found, the UE is configured to re-enable the high priority RAT and move to the high priority RAT cell. The move to the high priority RAT includes IMS PDN and the active IMS registration, both of which are valid across the RATs due to the interworking support. In this way, the UE is able to resolve any IMS failure while operating on the high priority RAT, which offers better user experience.

However, if the high priority RAT indicates during registration that the IMS PDN cannot be re-established on the high priority RAT, the UE will again disable the high priority RAT (e.g., as specified in 3GPP TS 24.501 section 4.3.2 and TS 24.301 section 4.9.2).

Figure 6:
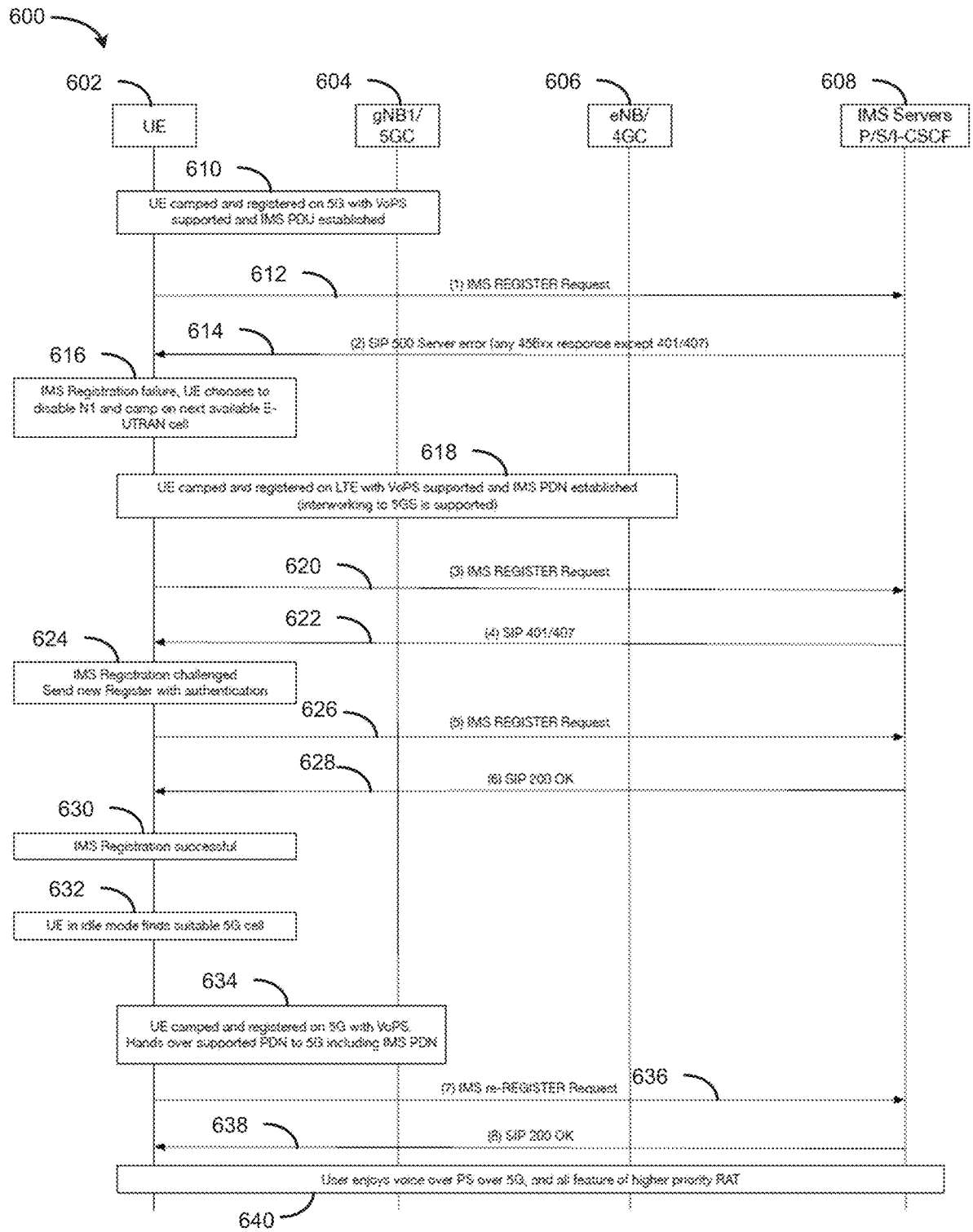
FIG. 6 illustrates a signaling flow for a UE re-enabling a high priority RAT when IMS registration is successful over a low priority RAT, according to some implementations of present disclosure.

FIG. 6 illustrates a signaling flow 600 for a UE 602 re-enabling a high priority RAT when IMS registration is successful over a low priority RAT, according to some implementations. As shown by block 610, the UE 602 is camped and registered on a 5G network that supports VoPS. Also, IMS PDU is established for the UE 602. The UE 602 sends an IMS register message 612 to IMS servers 608. In this example, the registration fails, and therefore, the IMS servers 608 send a failure message 614 to the UE 602. Here, the failure message 614 specifies a "SIP 500 server error."

As shown by block 616, in response to receiving the failure message 614, the UE 602 chooses to disable N1 and camp on the next available E-UTRAN cell. Then, as shown by block 618, the UE camps and registers on LTE (e.g., via eNB/4GC 606) with VoPS supported and IMS PDN established. In this example, interworking to 5GS is supported by the LTE network. Given that the failure is temporary and that the LTE network supports interworking with 5GS, the UE 602 sends an IMS register message 620 to the IMS servers 608. The IMS servers 608 send an IMS message 622 to the UE 602. The IMS message 622 includes a SIP 401 or a SIP 407 response, which are challenges by the IMS servers 608 to the registration request. In response to receiving the IMS message 622, the UE 602 generates a new registration message with authentication, as shown by block 624. The UE 602 then sends an IMS register message 626 to the IMS servers 608. Here, the IMS servers 608 approves the request, and send an IMS acceptance message 628 (e.g., SIP 200 OK) to the UE 602. As shown by block 630, the IMS registration is successful.

While the UE 602 is camped and registered on the low priority RAT (i.e., LTE), the UE 602 is configured to search for a high priority RAT cell of the same registered PLMN that supports VoPS and satisfies the S-criteria, as shown by block 632. The UE 602 finds a high priority RAT, and in response, the UE 602 re-enables the high priority RAT and moves to the high priority RAT cell, as shown by block 634. As also shown by block 634, the UE maps supported PDN, including the IMS PDN to corresponding 5G network PDUs. The UE 602 then sends an IMS re-register request message 636 to the IMS servers 608. In response, the IMS servers 608 approve the request, and send an IMS acceptance message 638 (e.g., SIP 200 OK) to the UE 602. As shown by block 640, the IMS registration is successful, and the UE 602 enjoys VoPS over 5G (in addition to the other features of the high priority RAT).

In another example, after the high priority RAT is disabled due to a temporary IMS registration failure, the UE camps and registers on a low priority RAT that supports non-3GPP access (e.g., voice over Wi-Fi [VoWifi], WLAN, Evolved Packet Data Gateway [ePDG], etc.). In particular, if the UE can connect to the IMS server through non-3GPP access and can proceed with the IMS registration on the IMS subsystem via the non-3GPP access. In this scenario, after successful registration on the lower priority RAT through non-3GPP access, the UE is configured to re-enable the higher priority RAT and reselect a suitable high priority RAT, e.g., one that meets access criteria per the UE's policy. However, if the IMS registration fails on the non-3GPP access after re-enabling the high priority RAT, the UE is configured to disable the high priority RAT (e.g., as defined in 3GPP TS 24.501 section 4.3.2 and TS 24.301 section 4.9.2).

In yet another example, after a higher priority RAT is disabled due to a temporary IMS registration failure, the UE registers with a lower priority RAT that does not support interworking. In this example, the UE is configured to periodically re-enable high priority RAT. A successful IMS registration indicates that the issues in P/S/I-CSCF during the previous IMS registration failure have been resolved. If the UE experiences any temporary failures/unresponsive IMS server during IMS PDN establishment and/or IMS registration, the UE will once again disable the high priority RAT (e.g., as defined in 3GPP TS 24501 section 4.3.2 and TS 24301 section 4.9.2). In some examples, an incremental gap is maintained between successive RAT re-enable attempts to reduce signaling overload on network.

As shown by these examples, the RAT disable is optimized based on the IMS registration failure cause. Thus, in scenarios where the UE reselects a low priority RAT due to IMS registration failure on high priority RAT, the UE shall camp on the low priority RAT and re-attempt IMS registration. After IMS is successfully registered on the low priority RAT and the UE finds a suitable high priority RAT cell of same registered PLMN (e.g., a cell that supports VoPS and is within the S-criteria), the UE shall re-enable the high priority RAT and reselect high priority RAT cell. In one example, the handover also includes the already successful IMS PDN and registration over to high priority RAT. Alternatively, the UE will initiate PDU establishment followed by new IMS registration.

FIG. 7A, FIG. 7B, FIG. 8A, FIG. 8B, and FIG. 9 illustrate flowcharts of example processes, according to some implementations. For clarity of presentation, the description that follows generally describes the processes in the context of the other figures in this description. As an example, the processes can be performed by one of a UE, a base station, or a communication system shown in FIG. 10. However, it will be understood that the processes may be performed, for example, by any suitable system, environment, software, and hardware, or a combination of systems, environments, software, and hardware, as appropriate. In some implementations, various steps of the processes can be run in parallel, in combination, in loops, or in any order.

Figure 7A:
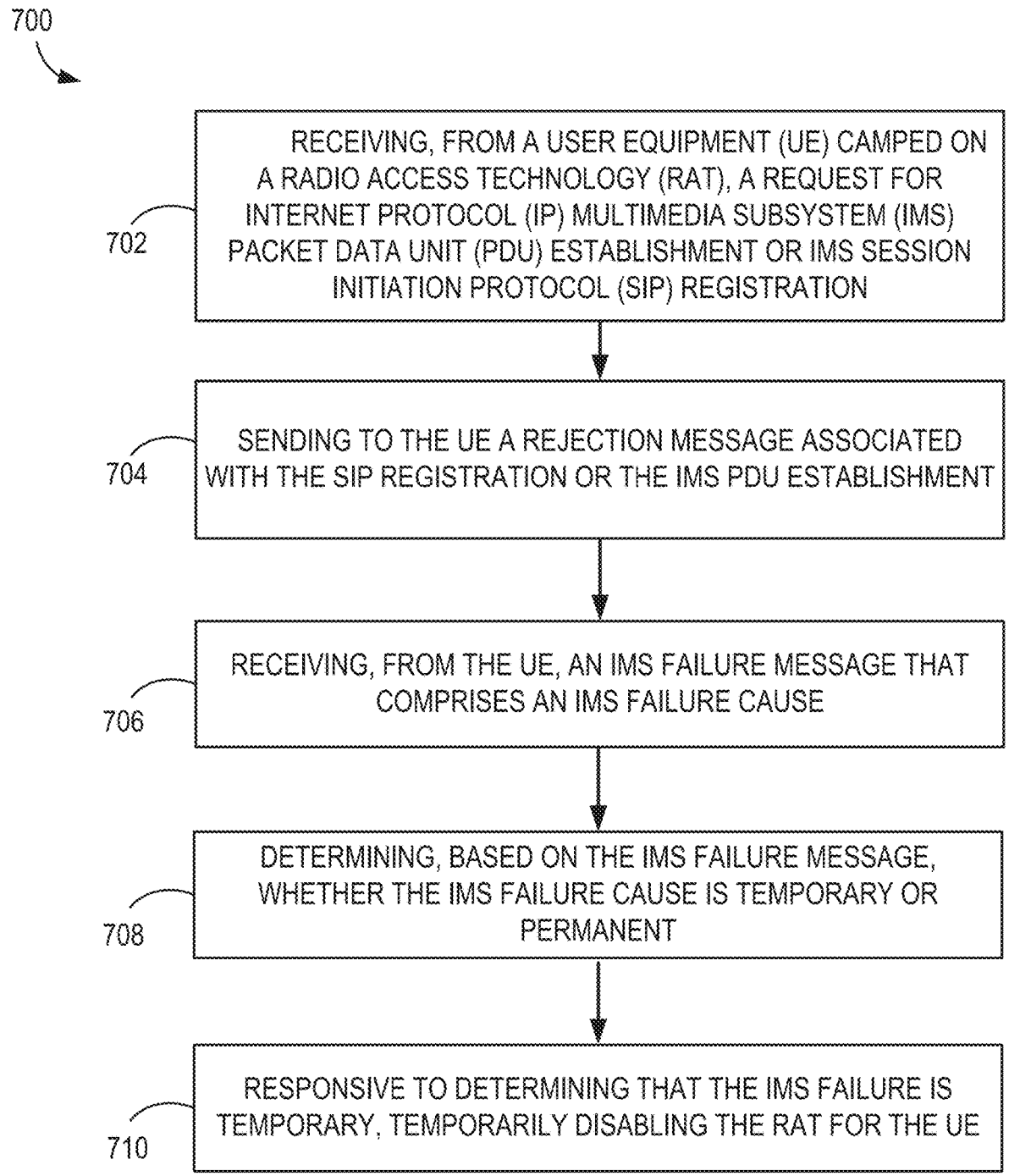

FIG. 7A illustrates an example process 700 for synchronizing an IMS failure received in a SIP message with a RAT disable type. In an embodiment, the example process 700 is performed by a communication system associated with a radio access technology (RAT). In an example, the communication system includes an Internet protocol (IP) multimedia subsystem (IMS) server.

At step 702, the process 700 involves receiving, from a user equipment (UE) camped on the RAT, a request for IMS Packet Data Unit (PDU) establishment or IMS session initiation protocol (SIP) registration.

At step 704, the process 700 involves sending to the UE a rejection message associated with the SIP registration or the IMS PDU establishment.

At step 706, the process 700 involves receiving, from the UE, an IMS failure message that comprises an IMS failure cause.

At step 708, the process 700 involves determining, based on the IMS failure message, whether the IMS failure cause is temporary or permanent.

At step 710, the process 700 involves responsive to determining that the IMS failure is temporary, temporarily disabling the RAT for the UE.

In some implementations, the IMS failure message further includes an IMS retry timer.

In some implementations, the process 700 further involves generating a RAT disable timer based on the IMS retry timer, where the communication system is configured to re-enable the temporarily disabled upon expiration of the RAT disable timer.

In some implementations, the process 700 further involves sending the RAT disable timer to the UE.

In some implementations, the process 700 further involves detecting expiration of the RAT disable timer, and responsively re-enabling the RAT for the UE.

In some implementations, determining that the IMS failure is temporary occurs in a first instance of performing the process 700. And in a second instance of performing the process 700, the process involves determining that the IMS failure is permanent, and responsively disabling the RAT for the UE permanently.

In some implementations, permanently disabling the RAT for the UE involves permanently disabling the RAT until usage settings of the UE change or the UE's power cycles.

In some implementations, the RAT is a $5^{th}$ generation mobile communication system (5GS) that supports voice over IMS.

Figure 7B:
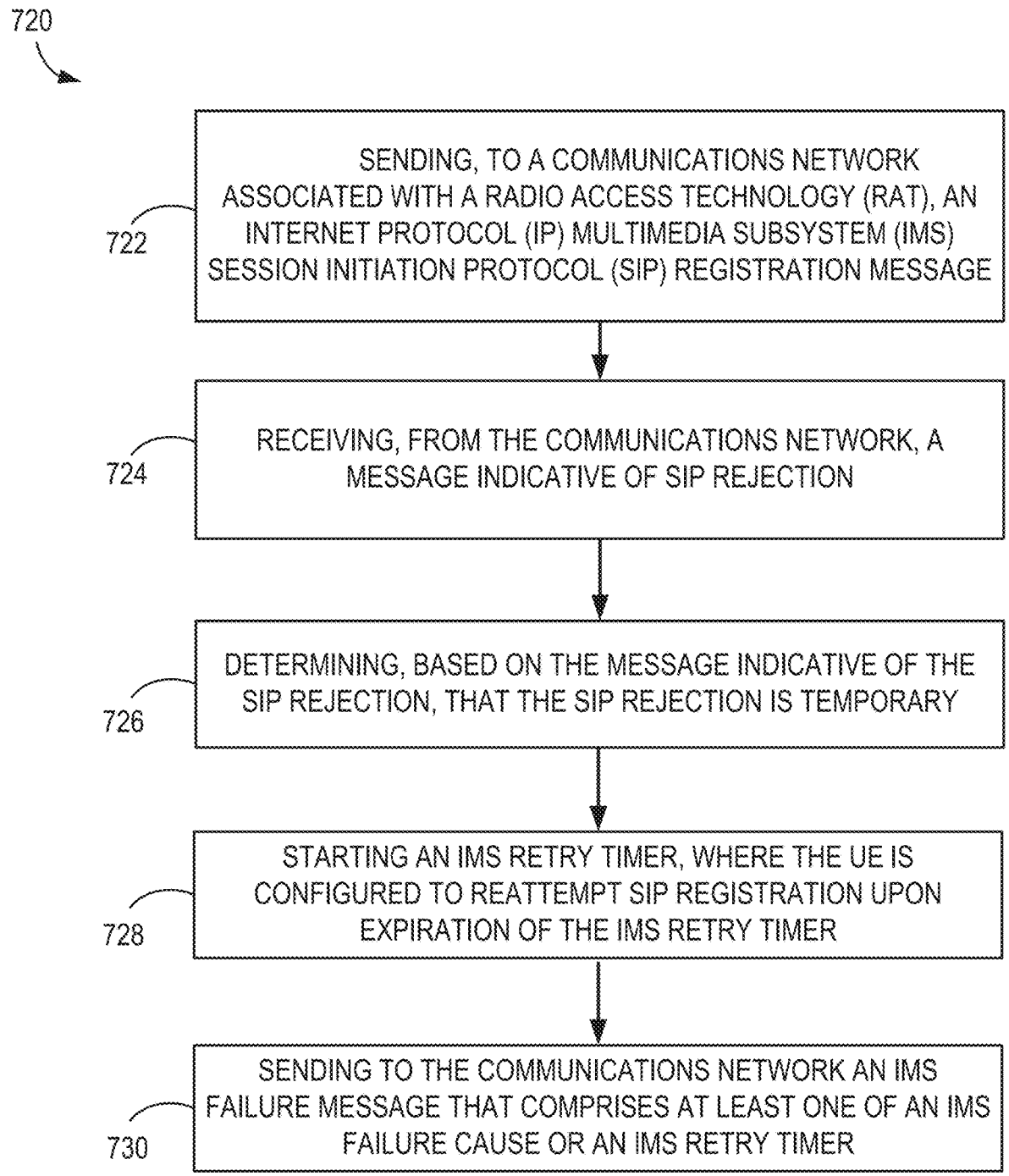

FIG. 7B illustrates an example process 720 for synchronizing an IMS retry-timer with a RAT disable timer. In an embodiment, the example process 720 is performed by a user equipment device (UE). In an example, the UE includes one or more antennas, and one or more radios configured to perform cellular communication using a radio access technology (RAT) that supports voice over an Internet protocol (IP) multimedia subsystem (IMS), where the UE is camped on the RAT.

At step 722, the process 720 involves sending, to a communications network associated with the RAT, an IMS session initiation protocol (SIP) registration message.

At step 724, the process 720 involves receiving, from the communications network, a message indicative of SIP rejection.

At step 726, the process 720 involves determining, based on the message indicative of the SIP rejection, that the SIP rejection is temporary.

At step 728, the process 720 involves starting an IMS retry timer, where the UE is configured to reattempt SIP registration upon expiration of the IMS retry timer.

At step 730, the process 720 involves sending to the communications network an IMS failure message that comprises at least one of an IMS failure cause or an IMS retry timer.

In some implementations, the process 720 further involves determining a new value for the IMS retry timer, wherein the new value is synchronized with a RAT disable timer starting.

In some implementations, determining a new value for the IMS retry timer involves receiving from the communications network the new value for the IMS retry timer.

In some implementations, determining a new value for the IMS retry timer involves calculating the new value using predetermined values provided by the communications network.

In some implementations, the process 720 further involves detecting expiration of the IMS retry timer; and responsively reattempting SIP registration with the communications network.

In some implementations, the RAT is a 5th generation mobile communication system (5GS).

Figure 8A:
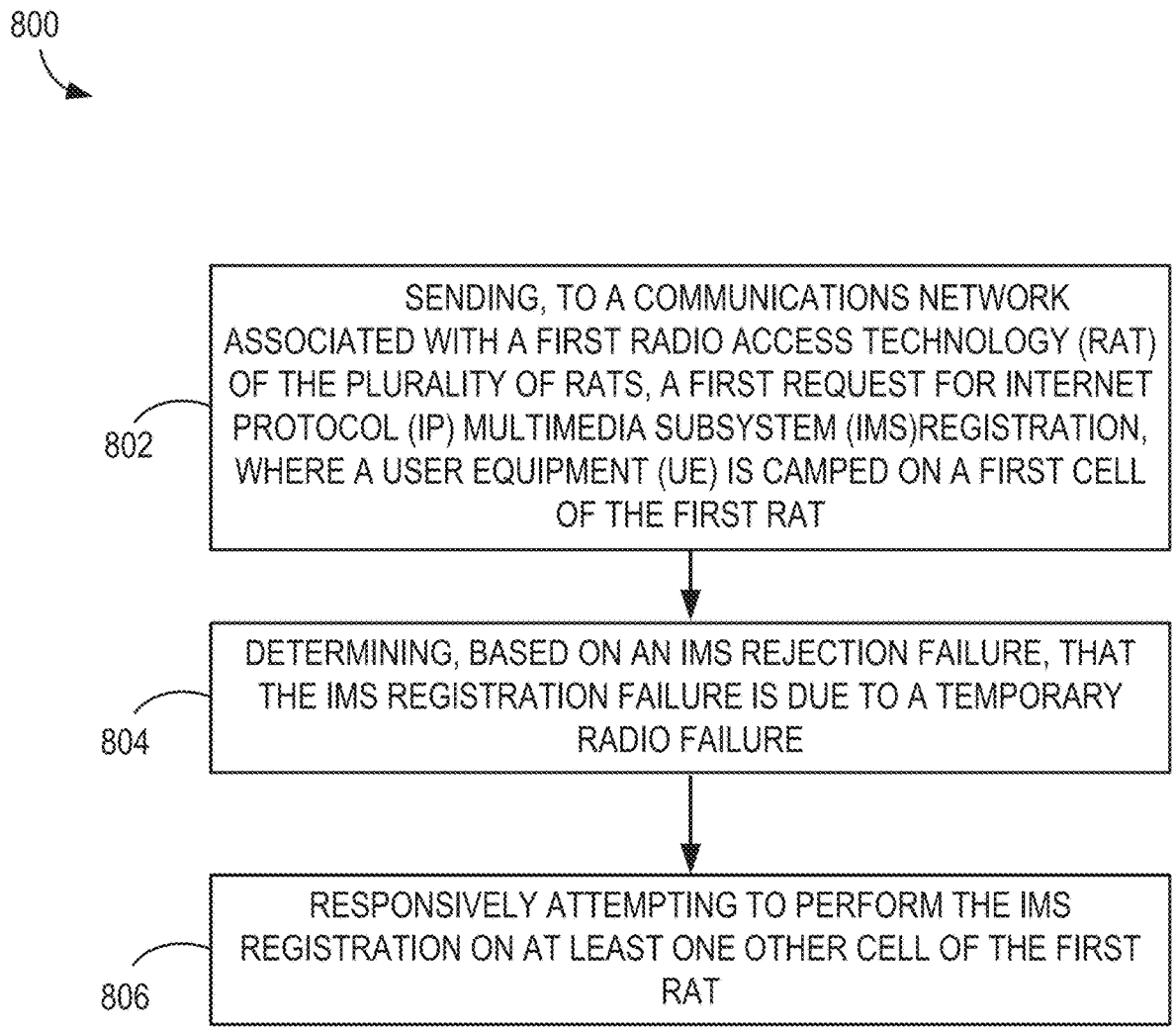

FIG. 8A illustrates an example process 800 for enabling a RAT. In an embodiment, the example process 800 is performed by a user equipment device (UE). In an example, the UE includes one or more antennas, and one or more radios configured to perform cellular communication using a plurality of radio access technologies (RATs) that support voice over an Internet protocol (IP) multimedia subsystem (IMS).

At step 802, the process 800 involves sending, to a communications network associated with a first RAT of the plurality of RATs, a first request for IMS registration, where the UE is camped on a first cell of the first RAT.

At step 804, the process 800 involves determining, based on a failure of the IMS registration, that the IMS registration failure is due to a temporary radio failure.

At step 806, the process 800 involves responsively attempting to perform the IMS registration on at least one other cell of the first RAT.

In some implementations, the UE is barred from registering with the first cell after receiving the IMS rejection message.

In some implementations, attempting to perform the IMS registration on at least one other cell associated with the first RAT involves: identifying a second cell associated with the first RAT, where the second cell shares a public land mobile network (PLMN) with the first cell; sending a second request for IMS registration to the communications network via the second cell; and receiving, from the communications network and via the second cell, an IMS approval message indicating that the IMS registration is successful.

In some implementations, identifying the second cell associated with the first RAT involves determining that the second cell satisfies at least one predetermined radio condition.

In some implementations, attempting to perform the IMS registration on at least one other cell associated with the first RAT involves: attempting to perform the IMS registration on each of the at least one other cell until: (i) the IMS registration is successful on one of the at least one other cell, (ii) a threshold number of attempts have been performed, or (iii) registration is attempted on each of the at least one other cell.

In some implementations, the process 800 further involves determining that the IMS registration on the at least one other cell has failed; and responsively determining to camp on a second cell associated with a second RAT of the plurality of RATs.

In some implementations, the process 800 further involves detecting a threshold location change for the UE; and responsively measuring a respective radio condition of one or more new cells associated with the first RAT, where the UE has not previously attempted IMS registration on the one or more new cells.

In some implementations, the process 800 further involves determining that the respective radio condition of a first new cell of the one or more new cells is greater than a predetermined threshold; responsively determining to camp on the first new cell; and sending a second request for IMS registration to the communications network via the first new cell.

In some implementations, the process 800 further involves measuring a respective radio condition of the at least one other cell of the first RAT.

In some implementations, the process 800 further involves determining that the respective radio condition of a third cell of the at least one other cell of the first RAT satisfies a predetermined condition; and responsively determining to camp on the third cell.

In some implementations, the process 800 further involves determining that a timer temporarily barring the at least one other cell or the first cell of the first RAT has expired; and responsively determining to camp on one of the at least one other cell or the first cell of the first RAT.

FIG. 8B illustrates an example process 810 for enabling a RAT. In an embodiment, the example process 810 is performed by a user equipment device (UE). In an example, the UE includes one or more antennas, and one or more radios configured to perform cellular communication using a plurality of radio access technologies (RATs) that support voice over an Internet protocol (IP) multimedia subsystem (IMS).

At step 812, the process 810 involves sending, from a user equipment (UE) to a communications network associated with a first radio access technology (RAT) of the plurality of RATs, a first request for Internet protocol (IP) multimedia subsystem (IMS) registration, where the UE is camped on a first cell of the first RAT.

At step 814, the process 810 involves determining, based on an IMS rejection failure, that the IMS registration failure is due to a temporary radio failure.

At step 816, the process 810 involves responsively attempting to perform the IMS registration on each other cell of the first RAT until the IMS registration is successful.

Figure 9:
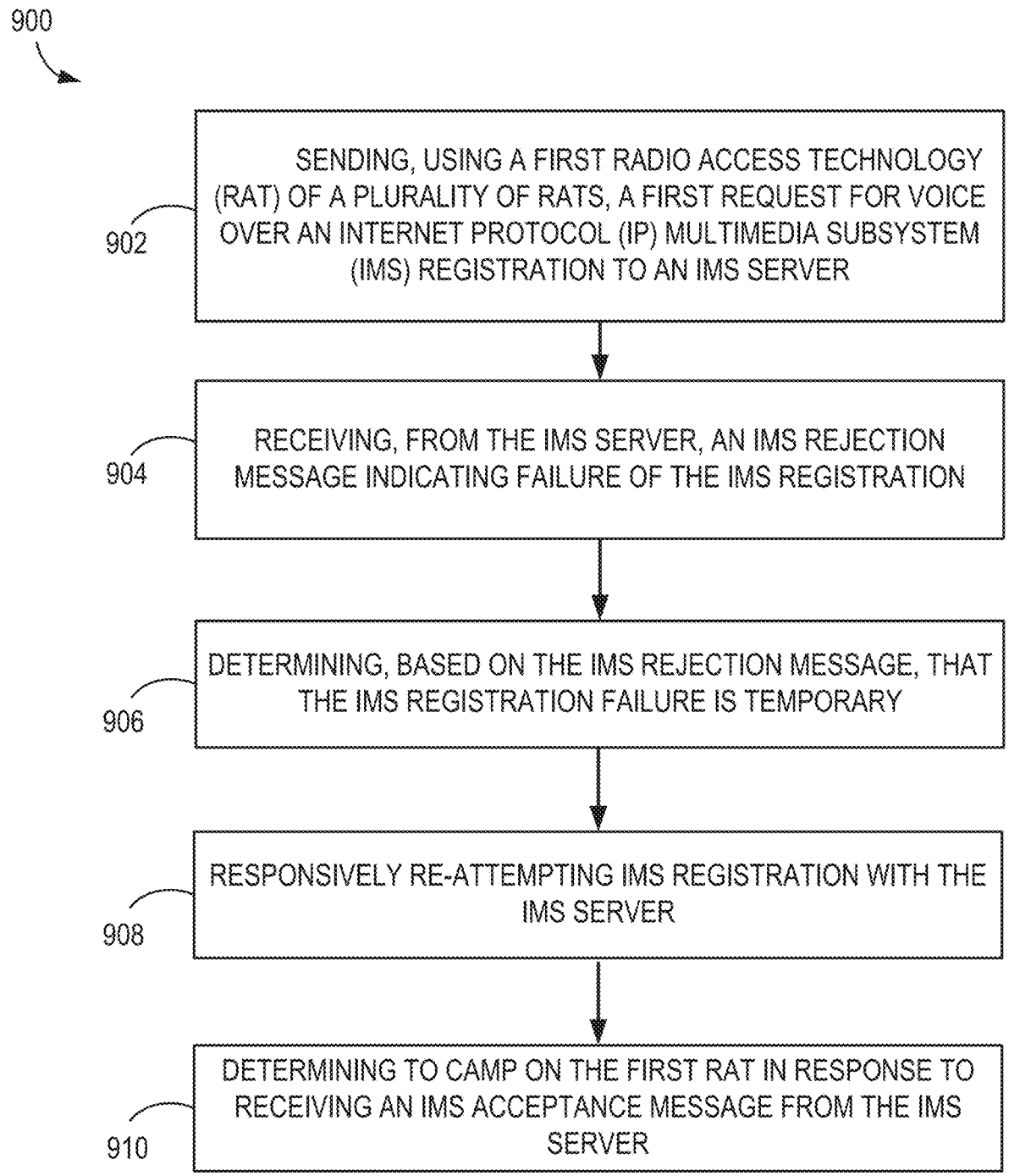

FIG. 9 illustrates a process 900 for re-enabling a high priority RAT. In an embodiment, the example process 900 is performed by a user equipment device (UE). In an example, the UE includes one or more antennas, and one or more radios configured to perform cellular communication using a plurality of radio access technologies (RATs) that support voice over an Internet protocol (IP) multimedia subsystem (IMS).

At step 902, the process 900 involves sending, using a first RAT of the plurality of RATs, a first request for IMS registration to an IMS server.

At step 904, the process 900 involves receiving, from the IMS server, an IMS rejection message indicating failure of the IMS registration.

At step 906, the process 900 involves determining, based on the IMS rejection message, that the IMS registration failure is temporary.

At step 908, the process 900 involves responsively re-attempting IMS registration with the IMS server.

At step 910, the process 900 involves determining to camp on the first RAT in response to receiving an IMS acceptance message from the IMS server.

In some implementations, the UE is camped on the first RAN, and re-attempting IMS registration with the IMS server involves: disconnecting from the first RAT and camping on a second RAT of the plurality of RATs; establishing an IMS Packet Data Network (PDN) with the second RAT; sending, via the second RAT, a second request for IMS registration to the IMS server; and receiving, via the second RAT, the IMS acceptance message from the IMS server.

In some implementations, the second RAT supports interworking with the first RAT, determining to camp on the first RAT in response to receiving the IMS acceptance message involves: identifying a second cell associated with the first RAT that has an acceptable radio condition; disconnecting from the second RAT and camping on the second cell associated with the first RAT; and handing over information associated with the IMS PDN to the second cell.

In some implementations, the acceptable radio condition has a value that is greater than a predetermined threshold.

In some implementations, the second RAT is a non-3GPP network.

In some implementations, the process 900 further involves periodically attempting to camp on the first RAT and re-attempting IMS registration with the IMS server via the first RAT.

In some implementations, the first RAT is a $5^{th}$ generation mobile communication system (5GS).

Figure 10:
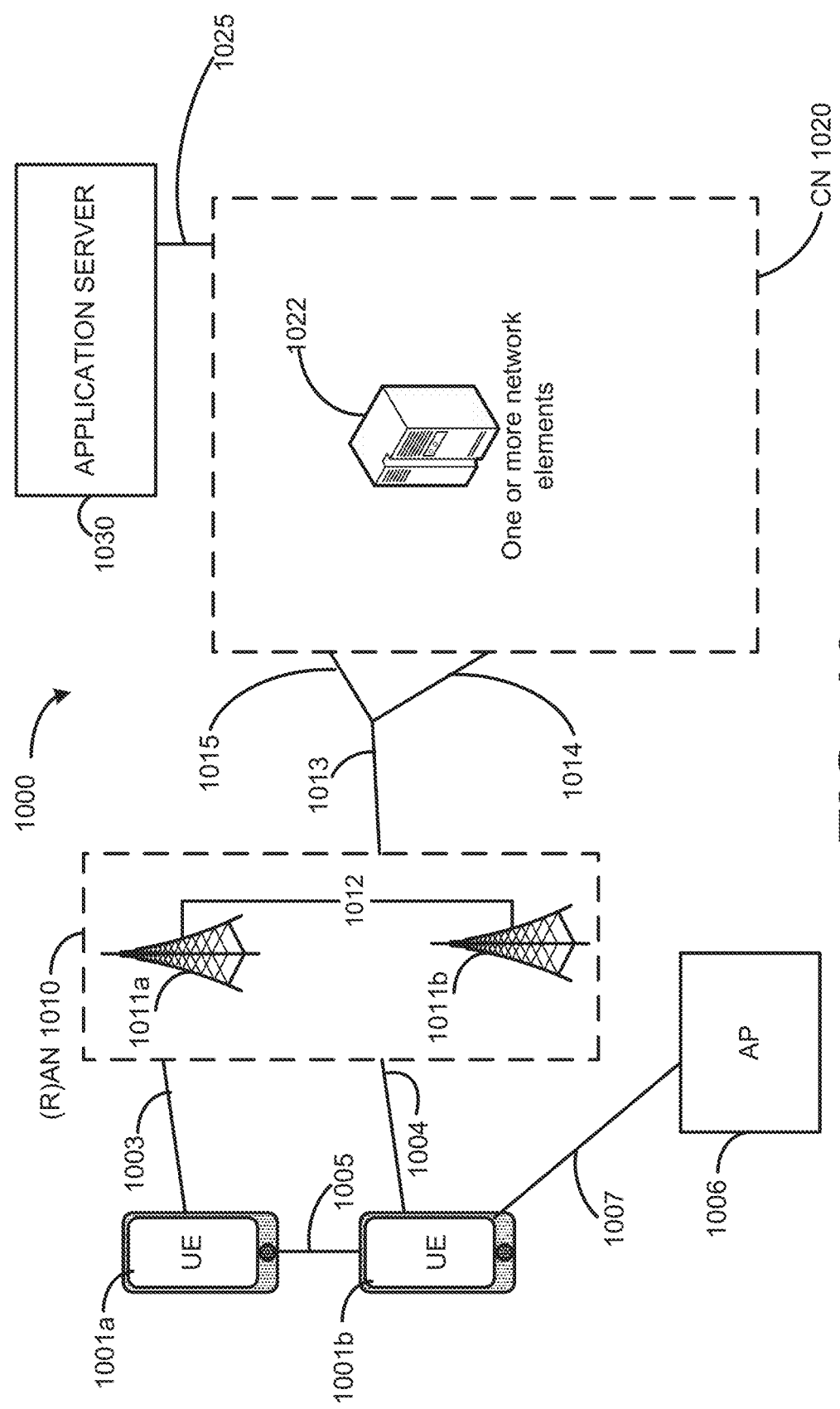
FIG. 10 illustrates an example of a wireless communication system, according to some implementations of present disclosure.

FIG. 10 illustrates an example of a wireless communication system 1000. For purposes of convenience and without limitation, the example system 100 is described in the context of Long Term Evolution (LTE) and Fifth Generation (5G) New Radio (NR) communication standards as defined by the Third Generation Partnership Project (3GPP) technical specifications. More specifically, the wireless communication system 1000 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 1000 may also be a Standalone (SA) network that incorporates only NR. Furthermore, other types of communication standards are possible, including future 3GPP systems (e.g., Sixth Generation (6G) systems, IEEE 802.16 protocols (e.g., WMAN, WiMAX, etc.), or the like).

As shown by FIG. 10, the system 1000 includes UE 1001a and UE 1001b (collectively referred to as "UEs 1001" or "UE 1001"). In this example, UEs 1001 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 1001 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1001 may be configured to connect, for example, communicatively couple, with RAN 1010. In embodiments, the RAN 1010 may be an NG RAN or a 5G RAN, an E-UTRAN, or a legacy RAN, such as a UTRAN or GERAN. As used herein, the term "NG RAN" or the like may refer to a RAN 1010 that operates in an NR or 5G system 1000, and the term "E-UTRAN" or the like may refer to a RAN 1010 that operates in an LTE or 4G system 1000. The UEs 1001 utilize connections (or channels) 1003 and 1004, respectively, each of which comprises a physical communications interface or layer (discussed in further detail below).

In this example, the connections 1003 and 1004 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In embodiments, the UEs 1001 may directly exchange communication data via a ProSe interface 1005. The ProSe interface 1005 may alternatively be referred to as a SL interface 1005 and may comprise one or more logical channels, including but not limited to a PSCCH, a PSSCH, a PSDCH, and a PSBCH.

The UE 1001b is shown to be configured to access an AP 1006 (also referred to as "WLAN node 1006," "WLAN 1006," "WLAN Termination 1006," "WT 1006" or the like) via connection 1007. The connection 1007 can comprise a local wireless connection, such as a connection consistent with any IEEE 802.11 protocol, wherein the AP 1006 would comprise a wireless fidelity (Wi-Fi®) router. In this example, the AP 1006 is shown to be connected to the Internet without connecting to the core network of the wireless system (described in further detail below). In various embodiments, the UE 1001b, RAN 1010, and AP 1006 may be configured to utilize LWA operation and/or LWIP operation. The LWA operation may involve the UE 1001b in RRC CONNECTED being configured by a RAN node 1011a-b to utilize radio resources of LTE and WLAN. LWIP operation may involve the UE 1001b using WLAN radio resources (e.g., connection 1007) via IPsec protocol tunneling to authenticate and encrypt packets (e.g., IP packets) sent over the connection 1007. IPsec tunneling may include encapsulating the entirety of original IP packets and adding a new packet header, thereby protecting the original header of the IP packets.

The RAN 1010 can include one or more AN nodes or RAN nodes 1011a and 1011b (collectively referred to as "RAN nodes 1011" or "RAN node 1011") that enable the connections 1003 and 1004. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 1011 that operates in an NR or 5G system 1000 (for example, a gNB), and the term "E-UTRAN node" or the like may refer to a RAN node 1011 that operates in an LTE or 4G system 1000 (e.g., an eNB). According to various embodiments, the RAN nodes 1011 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 1011 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 1011; a MAC/PHY split wherein RRC, PDCP, RLC, and MAC layers are operated by the CRAN/vBBUP and the PHY layer is operated by individual RAN nodes 1011; or a "lower PHY" split wherein RRC, PDCP, RLC, MAC layers and upper portions of the PHY layer are operated by the CRAN/vBBUP and lower portions of the PHY layer are operated by individual RAN nodes 1011. This virtualized framework allows the freed-up processor cores of the RAN nodes 1011 to perform other virtualized applications. In some implementations, an individual RAN node 1011 may represent individual gNB-DUs that are connected to a gNB-CU via individual F1 interfaces (not shown by FIG. 10). In these implementations, the gNB-DUs may include one or more remote radio heads or RFEMs, and the gNB-CU may be operated by a server that is located in the RAN 1010 (not shown) or by a server pool in a similar manner as the CRAN/vBBUP. Additionally or alternatively, one or more of the RAN nodes 1011 may be next generation eNBs (ng-eNBs), which are RAN nodes that provide E-UTRA user plane and control plane protocol terminations toward the UEs 1001, and are connected to a 5GC via an NG interface.

In V2X scenarios one or more of the RAN nodes 1011 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 1001 (vUEs 1001). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 1011 can terminate the air interface protocol and can be the first point of contact for the UEs 1001. In some embodiments, any of the RAN nodes 1011 can fulfill various logical functions for the RAN 1010 including, but not limited to, radio network controller (RNC) functions such as radio bearer management, uplink and downlink dynamic radio resource management and data packet scheduling, and mobility management.

In embodiments, the UEs 1001 can be configured to communicate using OFDM communication signals with each other or with any of the RAN nodes 1011 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1011 to the UEs 1001, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 1001 and the RAN nodes 1011 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band. NR in the unlicensed spectrum may be referred to as NR-U, and LTE in an unlicensed spectrum may be referred to as LTE-U, licensed assisted access (LAA), or MulteFire.

To operate in the unlicensed spectrum, the UEs 1001 and the RAN nodes 1011 may operate using LAA, eLAA, and/or feLAA mechanisms. In these implementations, the UEs 1001 and the RAN nodes 1011 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 1001 RAN nodes 1011, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 1001, AP 1006, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (s); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1001 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 1001. The PDCCH carries information about the transport format and resource allocations related to the PDSCH channel, among other things. It may also inform the UEs 1001 about the transport format, resource allocation, and HARQ information related to the uplink shared channel. Typically, downlink scheduling (assigning control and shared channel resource blocks to the UE 1001*b* within a cell) may be performed at any of the RAN nodes 1011 based on channel quality information fed back from any of the UEs

1001. The downlink resource assignment information may be sent on the PDCCH used for (e.g., assigned to) each of the UEs 1001.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 1011 may be configured to communicate with one another via interface 1012. In embodiments where the system 1000 is an LTE system (e.g., when CN 1020 is an EPC), the interface 1012 may be an X2 interface 1012. The X2 interface may be defined between two or more RAN nodes 1011 (e.g., two or more eNBs and the like) that connect to EPC 1020, and/or between two eNBs connecting to EPC 1020. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1001 from an SeNB for user data; information of PDCP PDUs that were not delivered to a UE 1001; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 1000 is a 5G or NR system (e.g., when CN 1020 is an 5GC), the interface 1012 may be an Xn interface 1012. The Xn interface is defined between two or more RAN nodes 1011 (e.g., two or more gNBs and the like) that connect to 5GC 1020, between a RAN node 1011 (e.g., a gNB) connecting to 5GC 1020 and an eNB, and/or between two eNBs connecting to 5GC 1020. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1001 in a connected mode (e.g., CM-CONNECTED) including functionality to manage the UE mobility for connected mode between one or more RAN nodes 1011. The mobility support may include context transfer from an old (source) serving RAN node 1011 to new (target) serving RAN node 1011; and control of user plane tunnels between old (source) serving RAN node 1011 to new (target) serving RAN node 1011. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 1010 is shown to be communicatively coupled to a core network-in this embodiment, core network (CN) 1020. The CN 1020 may comprise a plurality of network elements 1022, which are configured to offer various data and telecommunications services to customers/subscribers (e.g., users of UEs 1001) who are connected to the CN 1020 via the RAN 1010. The components of the CN 1020 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1020 may be referred to as a network slice, and a logical instantiation of a portion of the CN 1020 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 1030 may be an element offering applications that use IP bearer resources with the core network (e.g., UMTS PS domain, LTE PS data services, etc.). The application server 1030 can also be configured to support one or more communication services (e.g., VoIP sessions, PTT sessions, group communication sessions, social networking services, etc.) for the UEs 1001 via the EPC 1020.

In embodiments, the CN 1020 may be a 5GC (referred to as "5GC 1020" or the like), and the RAN 1010 may be connected with the CN 1020 via an NG interface 1013. In embodiments, the NG interface 1013 may be split into two parts, an NG user plane (NG-U) interface 1014, which carries traffic data between the RAN nodes 1011 and a UPF, and the S1 control plane (NG-C) interface 1015, which is a signaling interface between the RAN nodes 1011 and AMFs.

In embodiments, the CN 1020 may be a 5G CN (referred to as "5GC 1020" or the like), while in other embodiments, the CN 1020 may be an EPC. Where CN 1020 is an EPC (referred to as "EPC 1020" or the like), the RAN 1010 may be connected with the CN 1020 via an S1 interface 1013. In embodiments, the S1 interface 1013 may be split into two parts, an S1 user plane (S1-U) interface 1014, which carries traffic data between the RAN nodes 1011 and the S-GW, and the S1-MME interface 1015, which is a signaling interface between the RAN nodes 1011 and MMEs.

Figure 11:
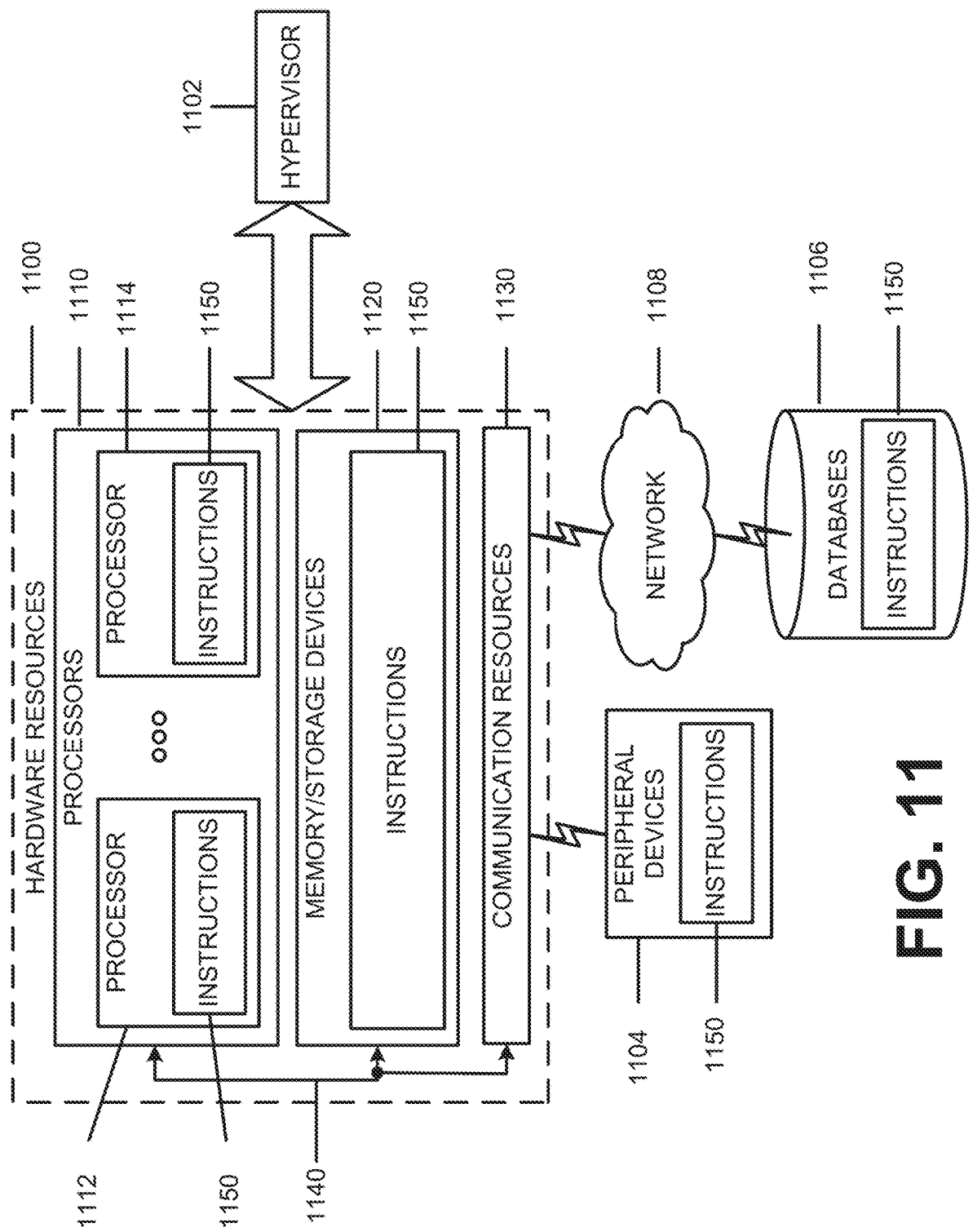
FIG. 11 illustrates a diagrammatic representation of hardware resources, according to some implementations of present disclosure.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For embodiments where node virtualization (e.g., NFV) is utilized, a hypervisor 1102 may be executed to provide an execution environment for one or more network slices/sub-slices to utilize the hardware resources 1100.

The processors 1110 may include, for example, a processor 1112 and a processor 1114. The processor(s) 1110 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1120 may include main memory, disk storage, or any suitable combination thereof. The memory/storage devices 1120 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via USB), cellular communication components, NFC components, Bluetooth® (or Bluetooth® Low Energy) components, Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

We claim:

1. A user equipment device (UE), comprising:
one or more antennas;
one or more radios, wherein each of the one or more radios is configured to perform cellular communication using a plurality of radio access technologies (RATs) that support voice over an Internet protocol (IP) multimedia subsystem (IMS);
one or more processors coupled to the one or more radios, wherein the one or more processors are configured to cause the UE to perform operations comprising:
sending, via a first RAT of the plurality of RATs, a first request for IMS registration to an IMS server;
receiving, from the IMS server, an IMS rejection message indicating failure of the IMS registration;
determining, based on the IMS rejection message, that the IMS registration failure is temporary;
responsively re-attempting IMS registration with the IMS server; and
determining to camp on the first RAT in response to receiving an IMS acceptance message from the IMS server.

2. The UE of claim 1, wherein the UE is camped on the first RAT, and wherein re-attempting IMS registration with the IMS server comprises:
disconnecting from the first RAT and camping on a second RAT of the plurality of RATs;
establishing an IMS Packet Data Network (PDN) with the second RAT;
sending, via the second RAT, a second request for IMS registration to the IMS server; and
receiving, via the second RAT, the IMS acceptance message from the IMS server.

3. The UE of claim 2, wherein the second RAT supports interworking with the first RAT, wherein determining to camp on the first RAT in response to receiving the IMS acceptance message comprises:
identifying a second cell associated with the first RAT that has an acceptable radio condition;
disconnecting from the second RAT and camping on the second cell associated with the first RAT; and
handing over information associated with the IMS PDN to the second cell.

4. The UE of claim 3, wherein the acceptable radio condition has a value that is greater than a predetermined threshold.

5. The UE of claim 2, wherein the second RAT is a non-3GPP network.

6. The UE of claim 2, the operations further comprising:
periodically attempting to camp on the first RAT and re-attempting IMS registration with the IMS server via the first RAT.

7. The UE of claim 1, wherein the first RAT is a 5$^{th}$ generation mobile communication system (5GS).

8. A method to be performed by a user equipment device (UE), the UE camped on a first radio access technology (RAT) of a plurality RATs, the method comprising:
sending, via the first RAT, a first request for IMS registration to an IMS server;
receiving, from the IMS server, an IMS rejection message indicating failure of the IMS registration;
determining, based on the IMS rejection message, that the IMS registration failure is temporary;

responsively re-attempting IMS registration with the IMS server; and determining to camp on the first RAT in response to receiving an IMS acceptance message from the IMS server.

9. The method of claim 8, wherein the UE is camped on the first RAT, and wherein re-attempting IMS registration with the IMS server comprises:
disconnecting from the first RAT and camping on a second RAT of the plurality of RATs;
establishing an IMS Packet Data Network (PDN) with the second RAT;
sending, via the second RAT, a second request for IMS registration to the IMS server; and
receiving, via the second RAT, the IMS acceptance message from the IMS server.

10. The method of claim 9, wherein the second RAT supports interworking with the first RAT, wherein determining to camp on the first RAT in response to receiving the IMS acceptance message comprises:
identifying a second cell associated with the first RAT that has an acceptable radio condition;
disconnecting from the second RAT and camping on the second cell associated with the first RAT; and
handing over information associated with the IMS PDN to the second cell.

11. The method of claim 10, wherein the acceptable radio condition has a value that is greater than a predetermined threshold.

12. The method of claim 9, wherein the second RAT is a non-3GPP network.

13. The method of claim 9, further comprising:
periodically attempting to camp on the first RAT and re-attempting IMS registration with the IMS server via the first RAT.

14. The method of claim 8, wherein the first RAT is a 5th generation mobile communication system (5GS).

15. A non-transitory computer readable memory medium storing program instructions executable by processing circuitry to cause a user equipment device (UE) camped on a first radio access technology (RAT) of a plurality RATs to perform operations comprising:
sending, via the first RAT, a first request for IMS registration to an IMS server;
receiving, from the IMS server, an IMS rejection message indicating failure of the IMS registration;
determining, based on the IMS rejection message, that the IMS registration failure is temporary;
responsively re-attempting IMS registration with the IMS server; and
determining to camp on the first RAT in response to receiving an IMS acceptance message from the IMS server.

16. The non-transitory computer readable memory medium of claim 15, wherein the UE is camped on the first RAT, and wherein re-attempting IMS registration with the IMS server comprises:
disconnecting from the first RAT and camping on a second RAT of the plurality of RATs;
establishing an IMS Packet Data Network (PDN) with the second RAT;
sending, via the second RAT, a second request for IMS registration to the IMS server; and
receiving, via the second RAT, the IMS acceptance message from the IMS server.

17. The non-transitory computer readable memory medium of claim 16, wherein the second RAT supports interworking with the first RAT, wherein determining to camp on the first RAT in response to receiving the IMS acceptance message comprises:
identifying a second cell associated with the first RAT that has an acceptable radio condition;
disconnecting from the second RAT and camping on the second cell associated with the first RAT; and
handing over information associated with the IMS PDN to the second cell.

18. The non-transitory computer readable memory medium of claim 17, wherein the acceptable radio condition has a value that is greater than a predetermined threshold.

19. The non-transitory computer readable memory medium of claim 16, wherein the second RAT is a non-3GPP network.

20. The non-transitory computer readable memory medium of claim 16, the operations further comprising:
periodically attempting to camp on the first RAT and re-attempting IMS registration with the IMS server via the first RAT.

* * * * *